(12) United States Patent
Bebawy et al.

(10) Patent No.: US 12,211,072 B2
(45) Date of Patent: *Jan. 28, 2025

(54) PRE-AUTHORIZATION TECHNIQUES FOR TRANSACTIONS

(71) Applicant: Block, Inc., San Francisco, CA (US)

(72) Inventors: Ramy Bebawy, San Francisco, CA (US); Lily Chiang, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,199

(22) Filed: Jan. 14, 2022

(65) Prior Publication Data

US 2022/0284480 A1 Sep. 8, 2022

Related U.S. Application Data

(63) Continuation of application No. 15/692,122, filed on Aug. 31, 2017, now Pat. No. 11,257,123.

(51) Int. Cl.
*G06Q 30/0251* (2023.01)
*G06Q 20/40* (2012.01)
*G06Q 30/0241* (2023.01)

(52) U.S. Cl.
CPC ........ *G06Q 30/0271* (2013.01); *G06Q 20/40* (2013.01); *G06Q 30/0249* (2013.01); *G06Q 30/0251* (2013.01); *G06Q 30/0268* (2013.01)

(58) Field of Classification Search
None
See application file for complete search history.

(56) References Cited

U.S. PATENT DOCUMENTS 6,694,300 B1 * 2/2004 Walker ............... G06Q 30/0215
705/26.81
8,285,602 B1 * 10/2012 Yi .......................... G06Q 30/00
705/26.7

(Continued)

OTHER PUBLICATIONS

"Best Practices for Authorization and Reversal Processing,", Visa, (Mar. 24, 2016), Retrieved from the Internet URL: https://usa.visa.com/dam/VCOM/download/merchants/best-practices-for-authorization-and-reversal-processing-for-lodging-car-rental-and-cruise-line-vbs%2024.mar.16.pdf, on Sep. 28, 2021, 5 pages.

(Continued)

*Primary Examiner* — Bion A Shelden
(74) *Attorney, Agent, or Firm* — Lee & Hayes, P.C.

(57) ABSTRACT

The disclosure describes, in part, techniques for performing pre-authorization during a transaction between a merchant a customer. For instance, a payment service may receive, from a merchant device, payment information of a payment instrument that is used to satisfy a cost of a first item. The payment service may then send an authorization request to a card payment network to hold a first amount of funds based on previous purchase activity. The payment service may further send the merchant device information associated with the customer. Next, the payment service may receive an indication that the customer requests to purchase a second item. In response, the payment service may send a request to the card payment network to capture a second amount of funds that is based on the cost of the first item and a cost of the second item. In response, the payment service may receive approval from the card payment network.

20 Claims, 12 Drawing Sheets

(56) References Cited

U.S. PATENT DOCUMENTS

| | | | |
|---|---|---|---|
| 8,986,608 | B2 | 3/2015 | Lam et al. |
| 9,286,608 | B1 | 3/2016 | Patel et al. |
| 10,198,749 | B1 | 2/2019 | Haskin |
| 11,257,123 | B1 | 2/2022 | Bebawy et al. |
| 2002/0161670 | A1 | 10/2002 | Walker et al. |
| 2003/0036998 | A1* | 2/2003 | Alliston ............... G07F 7/1008 705/40 |
| 2003/0135463 | A1 | 7/2003 | Brown et al. |
| 2003/0171996 | A1 | 9/2003 | Chen et al. |
| 2004/0093271 | A1* | 5/2004 | Walker .................. G06Q 30/02 705/26.1 |
| 2005/0197954 | A1* | 9/2005 | Maitland ........... G06Q 10/0631 705/39 |
| 2006/0195385 | A1 | 8/2006 | Khetrapal et al. |
| 2007/0192198 | A1 | 8/2007 | Schwarz |
| 2009/0138365 | A1 | 5/2009 | Mueller et al. |
| 2010/0057628 | A1 | 3/2010 | Trinidad et al. |
| 2011/0015960 | A1* | 1/2011 | Martin ................ G06Q 10/105 705/320 |
| 2011/0029403 | A1 | 2/2011 | Xu |
| 2011/0208656 | A1* | 8/2011 | Alba ..................... G06Q 20/20 705/65 |
| 2011/0259672 | A1 | 10/2011 | Kuo |
| 2012/0036073 | A1* | 2/2012 | Basu ..................... G06Q 20/42 705/44 |
| 2012/0166270 | A1* | 6/2012 | Coppinger ........ G06Q 30/0239 705/14.36 |
| 2013/0006776 | A1* | 1/2013 | Miller ................ G06Q 20/3276 705/44 |
| 2013/0006860 | A1* | 1/2013 | Balasubramanian .. G06Q 20/12 705/44 |
| 2013/0166402 | A1* | 6/2013 | Parento ................ G06Q 20/385 705/21 |
| 2014/0172627 | A1 | 6/2014 | Levy et al. |
| 2014/0279116 | A1 | 9/2014 | Vasquez et al. |
| 2015/0379514 | A1 | 12/2015 | Poole |
| 2016/0063563 | A1 | 3/2016 | Abad Fernandez et al. |
| 2016/0247177 | A1 | 8/2016 | Zamer |
| 2017/0180012 | A1 | 6/2017 | Tingler et al. |
| 2017/0293982 | A1 | 10/2017 | Gupta et al. |
| 2017/0337586 | A1 | 11/2017 | Izumo et al. |
| 2018/0047083 | A1 | 2/2018 | Agarwal et al. |
| 2018/0075035 | A1 | 3/2018 | Carlyle |
| 2018/0174133 | A1 | 6/2018 | Williams et al. |

OTHER PUBLICATIONS

Non-Final Office Action mailed Oct. 4, 2019, for U.S. Appl. No. 15/692,122, of Bebawy, R., et al., filed Aug. 31, 2017.

Final Office Action mailed Mar. 31, 2020, for U.S. Appl. No. 15/692,122, of Bebawy, R., et al., filed Aug. 31, 2017.

Advisory Action mailed Jun. 9, 2020, for U.S. Appl. No. 15/692,122, of Bebawy, R., et al., filed Aug. 31, 2017.

Non-Final Office Action mailed Jul. 23, 2020, for U.S. Appl. No. 15/692,122, of Bebawy, R., et al., filed Aug. 31, 2017.

Final Office Action mailed Jan. 4, 2021, for U.S. Appl. No. 15/692,122, of Bebawy, R., et al., filed Aug. 31, 2017.

Advisory Action mailed Mar. 12, 2021, for U.S. Appl. No. 15/692,122, of Bebawy, R., et al., filed Aug. 31, 2017.

Non-Final Office Action mailed Jun. 9, 2021, for U.S. Appl. No. 15/692,122, of Bebawy, R., et al., filed Aug. 31, 2017.

Notice of Allowance mailed Oct. 12, 2021, for U.S. Appl. No. 15/692,122, of Bebawy, R., et al., filed Aug. 31, 2017.

* cited by examiner

PRE-AUTHORIZATION TECHNIQUES FOR TRANSACTIONS

CROSS-REFERENCE TO RELATED APPLICATION(S)

This application is a continuation of and claims priority to, U.S. patent application Ser. No. 15/692,122, entitled "PRE-AUTHORIZATION TECHNIQUES FOR TRANSACTIONS", filed on Aug. 31, 2017, which is incorporated by reference herein in its entirety.

BACKGROUND

Merchants may conduct transactions for items and services with customers. During a transaction between a merchant and a customer, the merchant can use a point-of-sale (POS) device to input information associated with the transaction. For instance, the merchant can input information describing items that the customer is acquiring from the merchant, respective costs of each of the items, and an identifier of a payment instrument being used by the customer. The POS device can then send a request to a payment service to process the payment instrument for a cost of the transaction. In response, the POS device can receive a message from the payment service that indicates whether the payment instrument was authorized for the cost of the transaction.

BRIEF DESCRIPTION OF THE DRAWINGS

The above and other features of the present disclosure, its nature and various advantages, will be more apparent upon consideration of the following detailed description, taken in conjunction with the accompanying drawings in which.

Figure 1A:
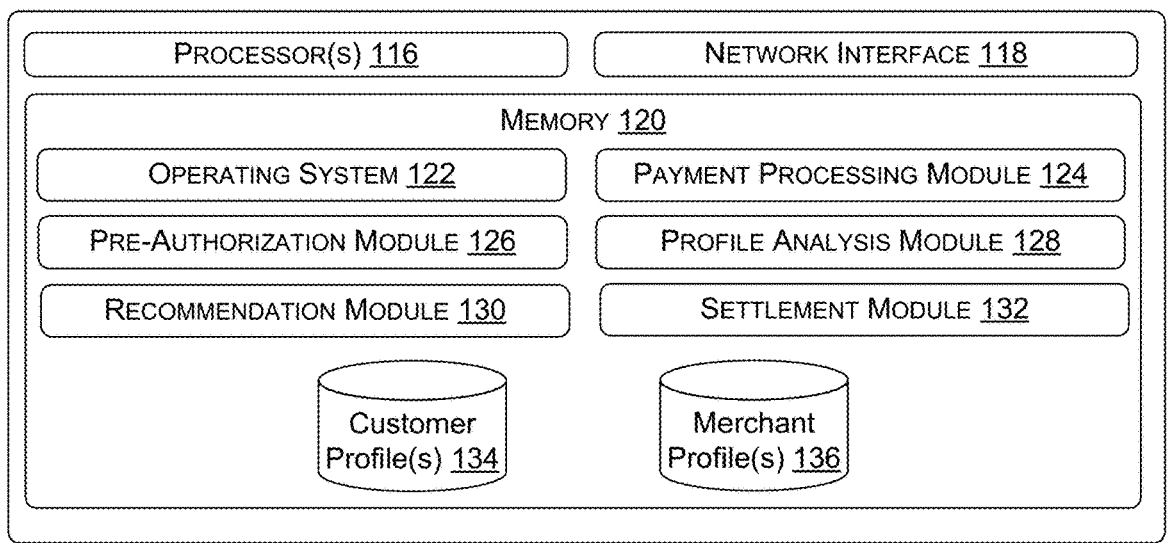
FIGS. 1A-1D illustrate an example environment of a payment service utilizing pre-authorization techniques during a transaction between a merchant and a customer.
Figure 1A:
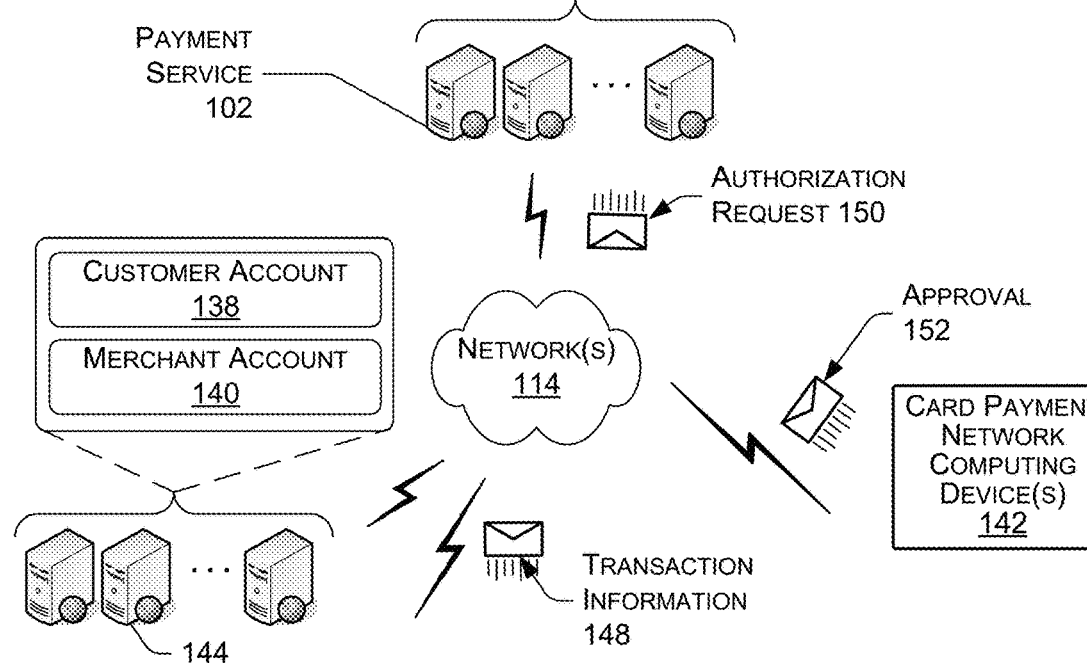
Figure 1A:
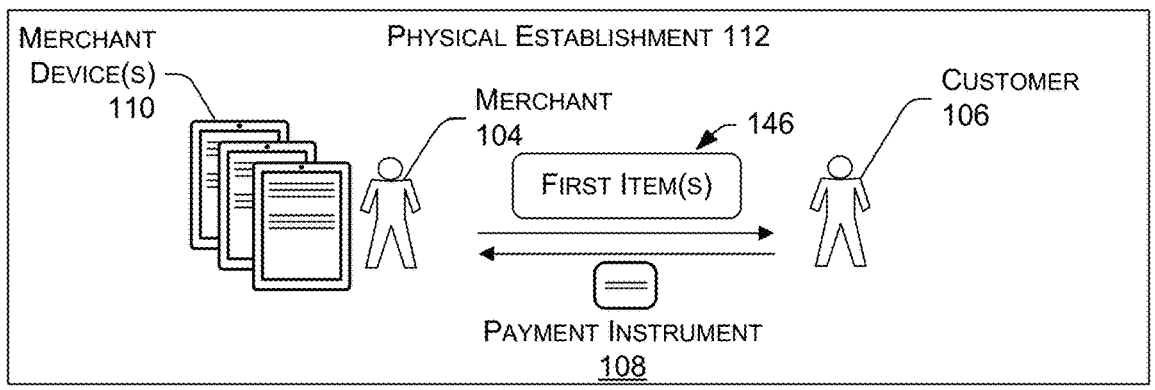

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The disclosure describes, in part, techniques for performing pre-authorization during a transaction between a merchant a customer, where the merchant may use information associated with the customer to provide one or more recommendations during the transaction. For instance, during a transaction, a merchant device associated with a merchant may receive transaction information associated with the transaction. The transaction information can indicate one or more of an identify of the customer, item(s) being acquired by the customer, cost(s) associated with each of the item(s), a total cost of the transaction, payment information associated with a payment instrument (which may be read from a card reader), a card payment network associated with the payment instrument, an issuing bank of the payment instrument, a time of the transaction, a geographical location of the transaction, a date of the transaction, or the like. In response, the merchant device can send at least a portion of the transaction information to a payment service for authorization.

The payment service may receive the transaction information from the merchant device and, in response, attempt to authorize the payment instrument for the transaction. For instance, the payment service may send a request to a card payment network (also referred to as a "credit card network") to authorize the payment instrument for the total cost of the transaction. In some instances, the card payment network may be associated with, and handle processing of, the payment instrument. For instance, the card payment network may authorize and process transactions that include the payment instrument. Additionally, for each authorized transaction, the card payment network may cause an electronic transfer of funds to be sent from the customer's account to the merchant's account.

The card payment network can receive the request from the payment service. Based on receiving the request, the card payment network can authorize the payment instrument for the total cost of the transaction. Additionally, the card payment network can cause funds to be electronically transferred from an account associated with the customer to an account associated with the merchant, where the funds are based on the total cost of the transaction. The card payment network may then send the payment service a messaging indicating that the funds were electronically transferred from the account associated with the customer to the account associated with the merchant. Based on receiving the message, the payment service can send an additional message to the merchant device indicating that the transaction has been approved.

In some instances, during and/or after the authorization process, such as after the merchant device sends the transaction information to the payment service for authorization, the customer may decide to acquire one or more additional items from the merchant. For instance, the merchant may recommend that the customer acquire an additional item and, in response to the recommendation, the customer may decide to acquire the additional item from the merchant. The merchant may then use the merchant device to conduct a second transaction with the customer for the additional item. For instance, the merchant device may receive additional transaction information associated with the second transaction, including the payment information associated with the payment instrument, and then send the additional transaction information to the payment service for another authorization after sending the initial authorization for the first item. The payment service may then authorize the payment instrument for a total cost of the second transaction.

As such, in order to avoid requiring the customer to provide the payment instrument for authorization if the customer decides to acquire an additional item from the merchant, the application describes a payment service that may pre-authorize the payment instrument for a first amount of funds based on receiving the initial transaction information from the merchant device. Pre-authorization can include verifying a transaction that is initiated with a payment instrument (e.g., credit card, debit card, etc.) and then holding a balance as unavailable until a merchant and/or a payment service settles the transaction (e.g., sends a request to capture the funds) or an expiration of given time period. In some instances, holding the balance can include deducting the balance from the customer's credit limit, when the payment instrument is a credit card, or deducting the balance from the customer's bank balance, when the payment instrument is a debit card. However, funds are not transferred to the merchant's account until the merchant sends a request to capture at least a portion of the funds.

For instance, to conduct a transaction using pre-authorization, the merchant device may receive first transaction information associated with the transaction. The first transaction information can indicate at least first item(s) acquired by the customer during the transaction, first cost(s) associated with each of the first item(s), a first total cost of the first cost(s), and payment information associated with a payment instrument. In response, the merchant device may send the first transaction information to the payment service for authorization. In some instances, the merchant device may further send a message indicating a first amount of funds to pre-authorize on the payment instrument. However, in other instances, the merchant device may not send the message indicating the first amount of funds to pre-authorize.

The payment service may receive the first transaction information from the merchant device. In instances where the merchant device sends the message indicating the first amount of funds to pre-authorize on the payment instrument, the payment service may further receive the message from the merchant device. However, in instances where the merchant device does not send the message indicating the first amount of funds to pre-authorize on the payment instrument, the payment service may determine the first amount funds to pre-authorize for the merchant. In some examples, the payment service may determine first amount of funds to pre-authorize based on the first total cost. For instance, the payment service may calculate the first amount of funds to pre-authorize by multiplying the first total cost by a given factor (e.g., two, three, five, etc.). Additionally, or alternatively, in some examples, the payment service may determine the first amount of funds to pre-authorize using a customer profile associated with the customer. For instance, the payment service may identify the customer profile using the payment information. The payment service may then analyze data associated with the customer profile, such as total costs of previous transactions involving the customer, to determine the first amount of funds to pre-authorize for the current transaction.

Additionally, or alternatively, in some instances, the payment service may determine the first amount of funds to pre-authorize on the payment instrument using information associated with the merchant. For instance, the payment service may identity a merchant profile associated with the merchant. The payment service may then analyze data associated with the merchant profile to identify the merchant's type of business. In some instance, the payment service may determine the merchant's type of business using a merchant category code (MCC) (and/or some other type of code) that is associated with the merchant. The payment service may then determine the first amount of funds based on the MCC. For instance, the payment service may determine a higher amount of funds to pre-authorize based on the MCC indicating that the merchant includes a first type of business, or calculate a lower amount of funds to pre-authorize based on the MCC indicating that the merchant includes a second type of business.

The payment service can then send a message to the card payment network that requests the card payment network to pre-authorize the payment instrument for the first amount of funds. The card payment network can receive the message from the payment service and, in response, attempt to verify the payment instrument for the first amount of funds. If the card payment network cannot verify the payment instrument for the first amount of funds, such as the customer's account does not include a balance that covers the first amount of funds, the card payment network can send a message back to the payment service that indicates that the payment instrument was not pre-authorized for the first amount of funds. However, if the card payment network does verify the payment instrument for the first amount of funds, then the card payment network can hold a balance that is equal to the first amount of funds until the merchant and/or the payment service settles the transaction or until an expiration of a given time period. Additionally, the card payment network can send a message back to the payment service that indicates that the payment instrument was pre-authorized for the first amount of funds.

The payment service can receive the message from the card payment network and, in response, send an additional message to the merchant device that indicates that the payment instrument was pre-authorized for the first amount of funds. In some instances, the payment service can further send the merchant device additional data, such as information associated with the customer, one or more recommendations for the customer, one or more promotions to offer the customer, and/or the like. The information can include an identity of the customer, whether the customer is a loyalty member, an amount of reward points the customer has acquired, item(s) previously acquired by the customer (either from the merchant and/or one or more additional merchants), preferences of the customer (e.g., likes coffee hot), and/or the like. The one or more recommendations can indicate item(s) and/or service(s) that the merchant should offer to the customer prior to finalizing the transaction (e.g., prior to when the transaction is settled). The one or more promotions can include coupons, promotions, discounts, and/or other deals for item(s) and/or service(s) that the merchant should offer to the customer prior to finalizing the transaction.

In some instances, the payment service can identify the additional data using the customer profile associated with the customer. For instance, as discussed above, the payment service can use the payment information to identity the customer profile associated with the customer. The payment service can then analyze data associated with the customer profile to identity the additional data to send to the merchant device. For example, the payment service can analyze the data associated with the customer profile to identity the name of the customer, the address of the customer, the date of birth of the customer, and/or the like. Additionally, the payment service can analyze the data associated with the customer profile (e.g., transaction data associated with previous transaction involving the customer) to identity item(s) and/or service(s) to recommend to for the customer. For example, if the customer acquired a second item along with the first item(s) during a previous transaction, the payment service can recommend the second item. For another example, a recommendation may indicate that the customer is a candidate for acquiring a second item in lieu of one of the first item(s), where the second item has a cost that is greater than the cost of the first item. Furthermore, the payment service can analyze the data associated with the customer profile to identity one or more promotions to offer the customer. For example, based on the customer receiving a threshold number of rewards point, the payment service can identify a reward to offer the customer.

The merchant device can receive the additional data from the payment service. Based on receiving the additional data, the merchant device can present at least a portion of the information associated with the customer, the one or more recommendations, and/or the one or more promotions. The merchant can then use the presented information, the one or more recommendations, and/or the one or more promotions to make recommendation(s) to the customer. For example, a recommendation may indicate a second item, and the merchant may suggest that the customer further acquire the second item from the merchant prior to finalizing the transaction. For another example, a recommendation may indicate that the merchant should upsell one of the first item(s) with a second item, and the merchant may suggest to the customer that the customer acquire the second item instead of the first item.

Based on the recommendation(s), the customer may decide to acquire second item(s) from the merchant. As such, the merchant device may receive second transaction information associated with the transaction, where the second transaction information indicates the second item(s) acquired by the customer, second cost(s) associated with each of the second item(s), and a second total cost of the second item(s). However, since the payment instrument was already pre-authorized for a first amount of funds that is greater than the first total cost of the first item(s), the merchant device may not, for a second time, receive the payment information associated with the payment instrument.

The merchant device can send the payment service the second transaction information associated with the transaction. Based on receiving the second transaction, the payment service can determine a second amount of funds for the transaction based on the first total cost of the first item(s) and the second total cost of the second item(s). In some instances, the payment service can then send the card payment network a message requesting that the card payment network authorize the payment instrument for the second amount of funds. In such instances, the card payment network can receive the message from the payment service and determine whether to authorize the payment instrument for the second amount of funds. For example, the card payment network may authorize the payment instrument for the second amount of funds based on the second amount of funds being less than or equal to the first amount of funds pre-authorized on the payment instrument, and not authorize the payment instrument based on the second amount of funds being greater than the first amount of funds pre-authorized on the payment instrument. For another example, the card payment network may authorize the payment instrument for the second amount of funds based on the second amount of funds being less than or equal to the first amount of funds pre-authorized on the payment instrument, and attempt to authorize the payment instrument for the second amount of funds based on the second amount of funds being greater than the first amount of funds pre-authorized on the payment instrument.

In some instances, the payment service authorizes the payment instrument for the second amount differently based on whether the payment instrument is a credit card or a debit card. For examples, if the second amount of funds is greater than the first amount of funds, the payment service may still authorize the payment instrument when the payment instrument is a credit card and not authorize the payment instrument when the payment instrument is a debit card. In either of the examples above, based on authorizing the second amount of funds, the card payment network can send the payment service a message indicating that the payment instrument is authorized for the second amount of funds.

The payment service can then settle the transaction between the merchant and the customer. For instance, the payment service can send the card payment network a message that requests the card payment network capture the second amount of funds for the transaction. In some instances, the payment service sends the message that request the card payment network to capture the second amount of funds in response to receiving a message from the merchant device that indicates that the transaction is complete. Additionally, or alternatively, in some instances, the payment service sends the message that requests the card payment network to capture the second amount of funds after a threshold amount of time. In either instance, the card payment network can receive the message from the payment service and, based on receiving the message, cause the second amount of funds to be electronically transferred from the customer's account to the merchant's account. In some instances, the card payment network can then send the payment service a message indicating that the second amount of funds has been electronically transferred. Additionally, the payment service can send the merchant device a message indicating that the transaction was approved for the second amount of funds, which, as discussed above, can equal the first total cost of the first item(s) and the second total cost of the second item(s).

In some instances, if the second amount of funds is less than the first amount of funds that was pre-authorized on the payment instrument, the card payment network can stop holding any remaining balance. For instance, the card payment network may stop holding the remaining balance which may be equal to a difference between the first amount of funds and the second amount of funds.

In some instances, by pre-authorizing the payment instrument for the transaction between the merchant and the customer for a first amount of funds that is greater than cost(s) of first item(s) being acquired by the customer, and then settling the transaction after the customer acquires second item(s) from the merchant, the techniques described herein improve transaction processing. For instance, in some examples, if the merchant upsells an initial transaction with additional items/services, then the merchant device is not required to receive the payment information multiple times in order to authorize multiple transactions between the merchant and the customer. Rather, the merchant device can receive the payment information once in order to authorize a single transaction for multiple items. Additionally, in some examples, the payment service is not required to communicate with the card payment network to processes multiple transactions between the merchant and the customer, where each transaction includes the card payment network electronically transferring funds from the customer's account to the merchant's account. In other words, transaction processing may be more secure, as the techniques can reduce the number of times that sensitive information (e.g., the payment information) is sent/received between electronic devices. Additionally, the techniques may reduce the number of authorization messages and communications that are sent and received at electronic devices, thereby saving computing resources and increasing processing speed.

It should be noted that, in some instances, the merchant device may include both a merchant-facing device and a buyer-facing device. In such instances, both the merchant-facing device and the buyer-facing device may present information based on the merchant-facing device receiving the additional data from the payment service. For instance, the merchant-facing device may present information associated with the customer, the one or more recommendations, and/or the one or more promotions. Additionally, the payment service may send an instruction to the merchant-facing device to present information using the buyer-facing device. In response, the merchant-facing device may send at least a portion of the additional data to the buyer-facing device so that the buyer-facing device can also present information associated with the customer, the one or more recommendations, and/or the one or more promotions. In some instances, both the merchant-facing device and the buyer-facing device present similar information. In other instances, the merchant-facing device and the buyer-facing device may present different information from one another.

It should further be noted that, in some instances, the merchant device may determine that the second amount of funds is greater than the first amount of funds pre-authorized on the payment instrument before sending the second transaction information to the payment service. In some instances, based on the determination, the merchant device may request that the merchant or the customer once again input the payment information associated with the payment instrument, such as by using a card reader. The merchant device can then send the payment information, included in the second transaction information, to the payment service for authorizing the payment instrument for the second amount of funds.

Furthermore, in some instances, the payment service may determine that the second amount of funds is greater than the first amount of funds pre-authorized on the payment instrument before sending the authorization associated with the second amount of funds and/or before sending the request to capture the second amount of funds. In some examples, based on such a determination, the payment service may send a message to the merchant device that requests the merchant device to send the payment service the payment information once again. Additionally, or alternatively, in some examples, based on such a determination, the payment service may send the card payment network a message that requests the card payment network to authorize the payment instrument for the second amount funds.

As described herein, messages can include any type of electronic communication that electronic devices can send and receive with other electronic devices. For instance, a message can include an email message, a short message service (SMS), multimedia messages (MMS), a voicemail message, audio data, video data, or any other type of electronic communication that an electronic device can send to another electronic device. In some instances, an electronic device may use messages to send indications, notifications, alerts, and/or requests to another electronic device. Additionally, in some instances, an electronic device may use messages to instruct (i.e., cause) another electronic device to perform a function (e.g., display information).

FIGS. 1A-1D illustrate an example environment 100 of a payment service 102 utilizing pre-authorization techniques during a transaction between a merchant 104 and a customer 106. For instance, during the transaction, the payment service 102 can receive payment information associated with a payment instrument 108 from merchant device(s) 110 and, in response, pre-authorize the payment instrument 108 for an amount of funds that is greater than a cost of a first item acquired by the customer 106. The merchant 104 can then make one or more recommendations during the transaction to the customer 106, such as a recommendation for an additional item/service. Since the payment instrument 108 has been pre-authorized for the amount of funds, the customer 106 can continue to add item(s)/service(s) to the transaction without again providing the payment instrument 108 to the merchant 104. The payment service 102 can then settle the transaction at a time the customer 106 is finished acquiring items/services from the merchant 104.

As used in herein, merchant device(s) 110 may comprise any sort of mobile or non-mobile devices (e.g., electronic device(s)) that include instances of application(s) that execute on the respective merchant device(s) 110. The application(s) may provide POS functionality to the merchant device(s) 110 to enable the merchant 104 (e.g., owners, employees, etc.) to at least accept payments from the customer 106. In some types of businesses, the merchant device(s) 110 may correspond to a store or other place of business of the merchant 104, and thus, may be a fixed location that typically does not change on a day-to-day basis. In other types of businesses, however, the location of the merchant device(s) 110 may change from time to time, such as in the case that the merchant 104 operate a food truck, is a street vendor, is a cab driver, etc., or has an otherwise mobile business, e.g., in the case the merchant 104 sells items at buyer's homes, places of business, and so forth. In either of the examples above, the place of business of the merchant 104 may be referred to a physical establishment 112.

Additionally, as used herein, a merchant 104 may include any business engaged in the offering of items (e.g., goods) or services for acquisition by customers. Actions attributed to the merchant 104 may include actions performed by owners, employees, or other agents of the merchant 104, and thus no distinction is made herein unless specifically discussed. In addition, as used herein, a customer 106 may include any entity that acquires items or services from a merchant 104, such as by purchasing, renting, leasing, borrowing, licensing, or the like. Hereinafter, items and/or services offered by the merchant 104 may be referred to solely as items. Thus, the merchant 104 and the customer 106 may interact with each other to conduct a transaction in which the customer 106 acquires item(s) from the merchant 104 and, in return, the customer 106 provides payment to the merchant 104.

As used herein, a transaction may include a financial transaction for the acquisition of items and/or services that is conducted between the merchant 104 and the customer 106. For example, when paying for a transaction, the customer 106 can provide the amount that is due to the merchant 104 using cash or other payment instrument 108 (e.g., a debit card, a credit card, a stored-value or gift card, a check, through an electronic payment application on a device carried by the customer 106, or the like). The merchant 104 can interact with the merchant device(s) 110 to process the transaction, such as by inputting (e.g., manually, using a magnetic card reader or an RFID reader, etc.) identifiers (e.g., payment information, such as a card number, account number, or any other account information) associated with the payment instrument 108. For example, a payment instrument 108 of the customer 106 may include one or more magnetic strips for providing card and customer information when swiped in a card reader. In other examples, the payment instrument 108 may include other types of payment cards, such as smart cards having a built-in memory chip that is read by the device when the card is "dipped" into the reader, a radiofrequency identification tag, or so forth.

During the transaction between the merchant 104 and the customer 106, the merchant device(s) 110 can determine transaction information describing the transaction, such as the payment information of the payment instrument 108, an amount of payment received from the customer 106, the item(s)/service(s) acquired by the customer 106, a time, place and date of the transaction, a card payment network associated with the payment instrument 108, an issuing bank of the payment instrument 108, a name of the customer 106, and so forth. The merchant device(s) 110 can send the transaction information to the payment service 102 over a network 114, either substantially contemporaneously with the conducting of the transaction (in the case of online transactions) or later when the device is in the online mode (in the case offline transactions).

The payment service 102 may include one or more processors 116, network interface(s) 118, and memory 120, which may store an operating system 122, a payment processing module 124, a pre-authorization module 126, a profile analysis module 128, a recommendation module 130, a settlement module 132, a customer profile(s) 134 database, and a merchant profile(s) 136 database. The payment processing module 124 may function to receive the information regarding the transaction from the merchant device(s) 110 and attempt to authorize the payment instrument 108 used to conduct the transaction. The payment processing module 124 may then send an indication of whether the payment instrument 108 has been approved or declined back to the merchant device(s) 110.

Generally, when the merchant 104 and the customer 106 enter into an electronic payment transaction, the transaction is processed by electronically transferring funds from a financial customer account 138 associated with the customer 106 to a financial merchant account 140 associated with the merchant 104. As such, the payment processing module 124 may communicate with one or more computing devices of a card payment network (also referred to as a "credit card network (CNN)") 142, e.g., MasterCard®, VISA®, over the network 114 to conduct financial transactions electronically. The payment processing module 124 can also communicate with one or more computing devices of one or more banks 144, processing/acquiring services, or the like over the network 114. For example, the payment processing module 124 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue the payment instrument 108 to the customer 106, and may pay acquiring banks for purchases made by the customer 106 to which the issuing bank has issued the payment instrument 108. Accordingly, in some examples, the computing device(s) of an acquiring bank may be included in the card payment network and may communicate with the computing devices of a card-issuing bank to obtain payment. Further, in some examples, a customer 106 may use a debit card instead of a credit card, in which case, the bank computing device(s) of a bank corresponding to the debit card may receive communications regarding a transaction in which the customer 106 is participating. Additionally, there may be computing devices of other financial institutions involved in some types of transactions or in alternative system architectures, and thus, the foregoing are merely several examples for discussion purposes.

In some instances, the payment service 102 may perform pre-authorization during the transaction between the merchant 104 and the customer 106. As discussed above, pre-authorization can include verifying the transaction that is initiated with the payment instrument 108 (e.g., credit card, debit card, etc.) and holding a balance as unavailable until the merchant 104 settles the transaction (e.g., sends a request to capture the funds) or an expiration of given time period. In some instances, holding the balance can include deducting the balance from the customer's credit limit, when the payment instrument 108 is a credit card, or deducting the balance from the customer's bank balance, when the payment instrument 108 is a debit card. However, funds are not transferred to the merchant account 140 until the merchant 104 sends a request to capture at least a portion of the funds.

In some instances, the given time period for expiring the transaction can depend on the type of transaction being conducted between the merchant 104 and the customer 106. For example, the time period may include a short time period (e.g., a minute, five minutes, etc.) when the customer 106 acquires item(s) from the merchant 104 that the customer 106 retrieves at a time of purchase. For another example, the time period may include a long time period (e.g., a week, a month, etc.) when the customer 106 acquires item(s) form the merchant 104 that requires the customer 106 to return at a later date for pick-up. Additionally, or alternatively, in some instances, the given time period for expiring the transaction can depend on the type of business associated with the merchant 104. For example, if the merchant 104 offers items for acquisition that customers normally retrieve at the time of purchase, then the time period may include a short time period. For another example, if the merchant 104 offers items for acquisition that customers purchase a first time, and then later pick-up at a second time, the time period may include a long time period. In some instances, the type of business may be determined using a merchant category code (MCC) associated with the merchant 104 (which may be determined using a merchant profile 136, as discussed below).

To conduct a transaction using pre-authorization, the merchant device(s) 110 may receive first transaction information associated with the transaction. The first transaction information can indicate at least first item(s) (and similarly first service(s)) acquired by the customer 106 during the transaction, first cost(s) associated with the first item(s) 146, a first total cost of the first item(s) 146 (which may include taxes, fees, discounts, etc.), and payment information associated with a payment instrument 108. In response, the merchant device(s) 110 may send the first transaction information 148 to the payment service 102 for authorization. In some instances, the merchant device(s) 110 may further send a message indicating a first amount of funds to pre-authorize on the payment instrument 108. For example, the merchant 104 may input the first amount of funds to pre-authorize into the merchant device(s) 110. For another example, the merchant device(s) 110 may determine the first amount of funds to pre-authorize for the transaction (using similar techniques as described below with regard to the payment service 102). However, in other instances, the merchant device(s) 110 may not send the message indicating the first amount of funds to pre-authorize.

The payment service 102 may receive the first transaction information 148 from the merchant device(s) 110. In instances where the merchant device(s) 110 send the message indicating the first amount of funds to pre-authorize on the payment instrument 108, the payment service 102 may further receive the message. However, in instances where the merchant device(s) 110 do not send the message indicating the first amount of funds to pre-authorize on the payment instrument 108, the payment service 102 may utilize the pre-authorization module 126 to determine the first amount funds to pre-authorize for the merchant 104.

In some instances, the pre-authorization module 126 may determine the first amount of funds to pre-authorize based on the first total cost of the first item(s) 146. For instance, the pre-authorization module 126 may calculate the first amount of funds to pre-authorize by multiplying the first total cost by a given factor, such as two, three, five, or the like. Additionally, or alternatively, the pre-authorization module 126 may determine the first amount of funds to pre-authorize using a customer profile 134 associated with the customer 106. For instance, the payment service 102 may identify the customer profile 134 using the identity of the customer 106 (e.g., based on the payment information). The pre-authorization module 126 may then analyze data associated with the customer profile 134 to determine the first amount of funds to pre-authorize on the payment instrument 108.

For instance, the data associated with the customer profile 134 may include transaction data associated with previous transactions involving the customer 106. The previous transactions can be between the customer 106 and the merchant 104 and/or between the customer 106 and one or more additional merchants. The pre-authorization module 126 can then analyze the transaction data to determine the first amount of funds. For example, the pre-authorization module 126 may determine the first amount of funds based on an average transaction amount of the previous transactions conducted by the customer 106. For another example, the pre-authorization module 126 may determine the first amount of funds based on the highest transaction amount of a previous transaction, the lowest transaction amount of a previous transaction, an amount that is between the highest transaction amount and the lowest transaction amount, and/or the like. In some instances, when using previous transactions to determine the first amount of funds, the pre-authorization module 126 may analyze transaction data associated with previous transactions conducted between the merchant 104 and the customer 106. Additionally, or alternatively, in some instances, when using previous transactions to determine the first amount of funds, the pre-authorization module 126 may analyze transaction data associated with previous transactions between one or more other merchants and the customer 106.

In some instances, the pre-authorization module 126 may determine the first amount of funds to pre-authorize using a merchant profile 136 associated with the merchant 104. For instance, the pre-authorization 126 may analyze data associated with the merchant profile 136 to determine the first amount of funds to pre-authorize on the payment instrument 108. In some instances, the data associated with the merchant profile 136 may include transaction data associated with previous transactions involving the merchant 104. For example, the pre-authorization module 126 may determine the first amount of funds based on an average transaction amount of the previous transactions conducted by the merchant 104. For another example, the pre-authorization module 126 may determine the first amount of funds based on the highest transaction amount of a previous transaction, the lowest transaction amount of a previous transaction, an amount that is between the highest transaction amount and the lowest transaction amount, and/or the like.

In some instances, the data associated with the merchant profile 136 may include data describing a type of business. For instance, the data may indicate an MCC associated with the merchant 104. In such instances, the pre-authorization module 126 may determine the first amount of funds to pre-authorize on the payment instrument 108 based on the data describing the type of business. For example, the pre-authorization module 126 may calculate a higher amount of funds to pre-authorize based on the MCC indicating that the merchant 104 includes a first type of business, or calculate a lower amount of funds to pre-authorize based on the MCC indicating that the merchant 104 includes a second type of business.

The payment service 102 can then send a message to the card payment network 142 that requests the card payment network to authorize the payment instrument for the first amount of funds, which is represented by the authorization request 150. In some instances, such as with a debit card, the authorization request 150 can include a pre-authorization message for the first amount. In some instances, such as with a credit card, the authorization request 150 can include an authorization message for the first amount. The card payment network 142 can receive the message from the payment service 102 and, in response, attempt to verify the payment instrument 108 for the first amount of funds. For example, when the payment instrument 108 includes a credit card, the card payment network 142 may verify the payment instrument 108 for the first amount funds based on the credit limit including a balance that is greater than or equal to the first amount of funds, and not verify the payment instrument 108 for the first amount of funds based on the credit limit including a balance that is less than the first amount of funds. For another example, when the payment instrument 108 includes a debit card, the card payment network 142 may verify the payment instrument 108 for the first amount funds based on the balance in the customer's bank account being greater than or equal to the first amount of funds, and not verify the payment instrument 108 for the first amount of funds based on the balance in the customer's bank account being less than the first amount of funds.

In some instances, when the card payment network 142 does not verify the pre-authorization of the payment instrument 108 for the first amount funds, the card payment network 142 can send a message back to the payment service 102 that indicates that the payment instrument 108 was not pre-authorized. However, in other instances, when the card payment network 142 verifies the pre-authorization of the payment instrument 108 for the first amount funds, the card payment network 142 can hold a balance that is equal to the first amount of funds until the merchant settles the transaction or until the expiration of the given time period. Additionally, the card payment network 142 can send a message back to the payment service 102 that indicates that the payment instrument 108 was pre-authorized for the first amount of funds, which is represented by message 152.

Figure 1B:
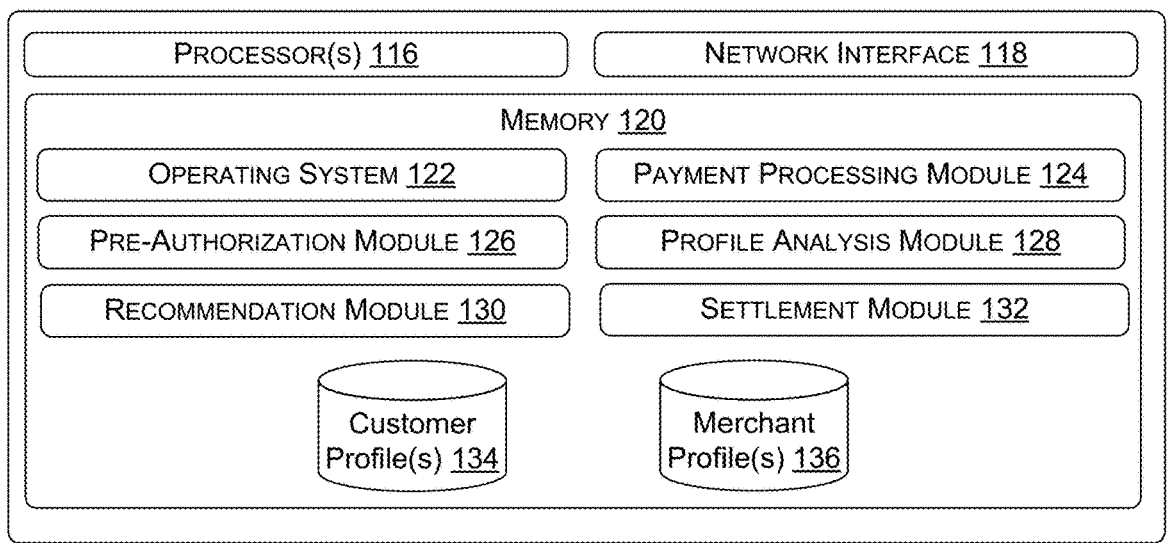
Figure 1B:
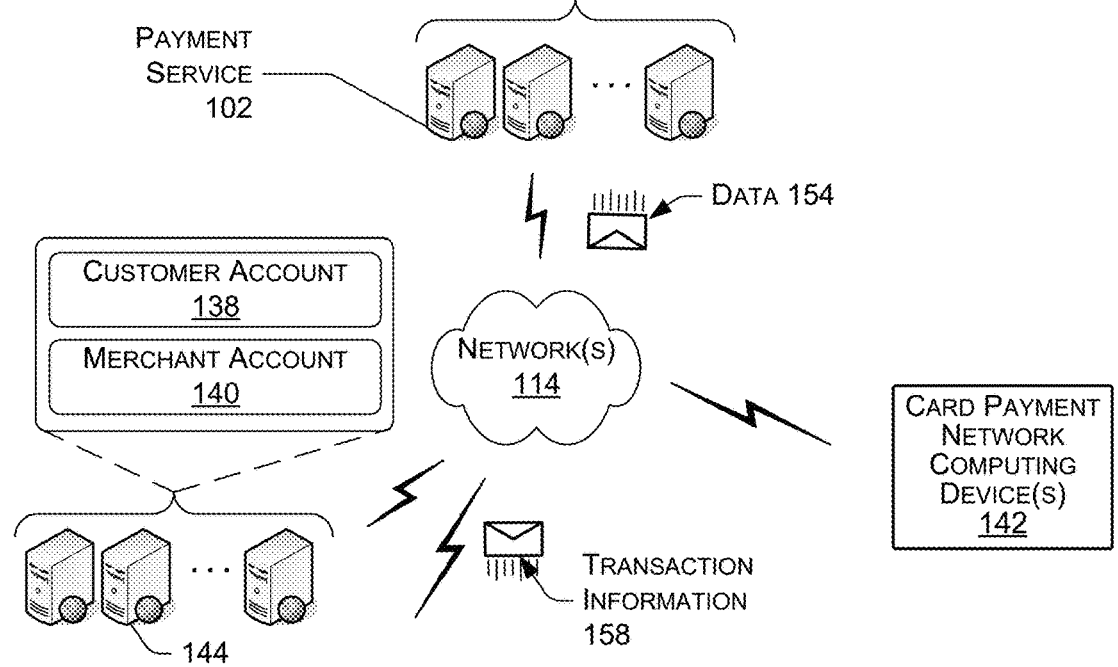
Figure 1B:
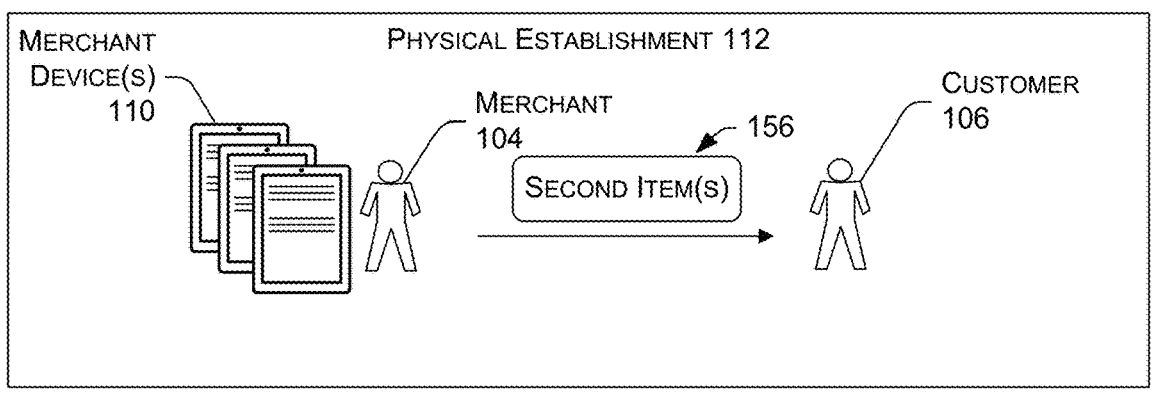

As shown in FIG. 1B, the payment service 102 can receive the message from the card payment network 142 and, based on receiving the message, send data 154 to the merchant device(s) 110. In some instances, the data 154 can include a message that indicates that the payment instrument 108 was pre-authorized for the first amount of funds. Additionally, or alternatively, in some instances, the data 154 can include information associated with the customer 106, one or more recommendations for the customer 106, one or more promotions to offer the customer 106, and/or the like. For instance, the customer information can include an identity of the customer 106, whether the customer 106 is part of a loyalty program, an amount of reward points the customer 106 has acquired, item(s) previously acquired by the customer 106 (either from the merchant 104 and/or one or more additional merchants), preferences of the customer 106 (e.g., likes coffee hot), and/or the like. The one or more recommendations can indicate item(s) and/or service(s) that the merchant 104 should offer to the customer 106. The one or more promotions can include coupons, promotions, discounts, and/or other deals for item(s) and/or service(s).

In some instances, the payment service 102 can utilize the profile analysis module 128 to analyze data associated with the customer profile 134 in order to identify at least a portion of the additional data 154. For instance, as discussed above, the payment service 102 can use the payment information to identity the customer profile 134. The profile analysis module 128 can then analyze the data associated with the customer profile 134 to identity the name of the customer, the address of the customer, the date of birth of the customer, and/or the like. Additionally, the profile analysis module 128 can analyze the data associated with the customer profile 134 (e.g., previous transaction data associated with previous transaction involving the customer 106) to identity item(s) previously acquired by the customer 106, either from the merchant 104 and/or from one or more other merchants. Furthermore, the profile analysis module 128 can analyze the data associated with the customer profile 134 to identify whether the customer 106 is part of a loyalty program associated with the merchant 104.

The payment service 102 can further utilize the recommendation module 130 to determine item(s) that the merchant 104 should recommend to the customer 106. For instance, the recommendation module 130 may analyze the item(s) previously acquired by the customer 106 to determine at least one new item that the merchant 104 should recommend the customer 106 acquire before finalizing the transaction (e.g., before the transaction is settled). For a first example, if the customer 106 has already acquired a first item 146 from the merchant 104 during the transaction, and the transaction data indicates that during a previous transaction with the merchant 104 (and/or one or more other merchants) the customer 106 acquired the first item 146 along with a second item, the recommendation module 130 may determine that the merchant 104 should offer the second item to the customer 106 during the transaction. For a second example, if the transaction data indicates that during previous transactions with the merchant 104 (and/or one or more other merchants) the customer 106 usually acquires a second item, which was not included in the first item(s) 146, the recommendation module 130 may determine that the merchant 104 should offer the second item to the customer 106 during the transaction. For a third example, based on the first item(s) 146 the customer 106 has already requested to acquire from the merchant 104 during the transaction, the recommendation module 150 may determine that the merchant 104 should recommend an upsell from one of the first item(s) 146 to a second item, where a cost of the second item is greater than a cost of the first item 146.

The payment service 102 can further utilize the recommendation module 130 to determine one or more promotions that the merchant 104 should offer to the customer 106 before the transaction is finalized (e.g., before the transaction is settled). For example, based on the results from the profile analysis module 128, the recommendation module 130 may determine that the customer 106 is not a member of the loyalty program. As such, the recommendation module 130 may determine that the merchant 104 should suggest to the customer 106 that the customer 106 signs up for the loyalty program. For another example, based on the results from the profile analysis module 128, the recommendation module 130 may identify a number of loyalty points that the customer 106 as received from previous transactions with the merchant 104. The recommendation module 130 may then identify one or more promotions to offer to the customer 106 based on the number of loyalty points. For instance, a promotion may include a free upsell from one of the first item(s) 146 to a second item offered for acquisition by the merchant 104, where a cost of the second item is greater than the cost of the first item 146.

The merchant device(s) 110 can receive the additional data 154 from the payment service 102. Based on receiving the additional data 154, the merchant device(s) 110 can present at least a portion of the information associated with the customer, the one or more recommendations, and/or the one or more promotions. The merchant 104 can then use the presented information, the one or more recommendations, and/or the one or more promotions to make recommendation(s) for the customer 106. For a first example, the merchant 104 can recommend that the customer 106 further acquire second item(s) 156 from the merchant 104. For a second example, the merchant 104 may offer the customer 106 a promotional offer for the second item(s) 156 offered by the merchant 104. For a third example, the merchant 104 may suggest that the customer 106 join a loyalty program associated with the merchant 104.

Based on the recommendation(s), the customer 106 may decide to acquire the second item(s) 156 from the merchant 104. As such, and before the transaction is finalized (e.g., before the transaction is settled), the merchant device(s) 110 may receive second transaction information associated with the transaction, where the second transaction information indicates at least the second item(s) 156 acquired by the customer 106, second cost(s) associated with the second item(s) 156, and a second total cost (which may include taxes, fees, discounts, etc.) of the second item(s). However, since the payment instrument 108 was already pre-authorized for a first amount of funds that is greater than the first total cost of the first item(s) 146, the merchant device(s) 110 may not, for a second time, receive the payment information associated with the payment instrument 108. For instance, the neither the merchant 104 nor the customer 106 may input the payment information using a card reader associated with the merchant device(s) 110.

Figure 1C:
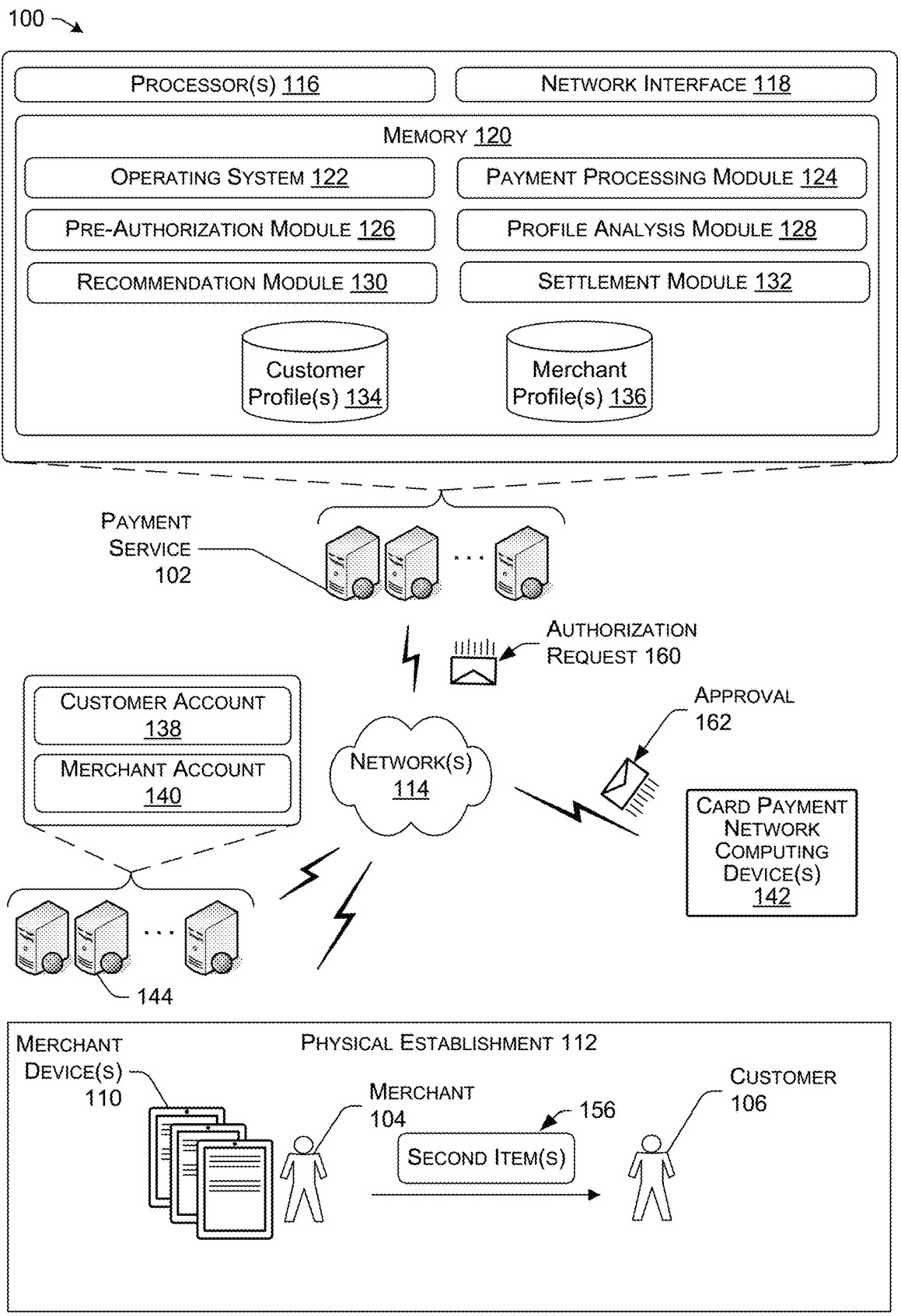

The merchant device(s) 110 can send the payment service 102 the second transaction information 158 associated with the transaction. Based on receiving the second transaction 158, the payment service 102 can determine a second amount of funds for the transaction based on the first total cost of the first item(s) 146 and the second total cost of the second item(s) 156. In some instances, and as illustrated in FIG. 1C, the payment service 102 can then send the card payment network 142 a message requesting that the card payment network 142 authorize the payment instrument 108 for the second amount of funds, which is represented by message 160. In some instances, sending the message 160 can include updating the initial authorization request 150 for the second amount. In some instances, the card payment network 142 can receive the message 160 and determine whether to authorize the payment instrument 108 for the second amount of funds. For example, the card payment network 142 may authorize the payment instrument 108 for the second amount of funds based on the second amount of funds being less than or equal to the first amount of funds pre-authorized on the payment instrument 108, and not authorize the payment instrument 108 based on the second amount of funds being greater than the first amount of funds pre-authorized on the payment instrument 108. For another example, the card payment network 142 may authorize the payment instrument 108 for the second amount of funds based on the second amount of funds being less than or equal to the first amount of funds pre-authorized on the payment instrument 108, and attempt to authorize the payment instrument 108 for the second amount of funds based on the second amount of funds being greater than the first amount of funds pre-authorized on the payment instrument 108. In either example, based on the authorization, the card payment network 142 can send the payment service 102 a message indicating whether the payment instrument 108 is authorized for the second amount of funds, which is represented by message 162.

In some instances, the customer 106 can continue to add item(s) to the transaction. For instance, the payment service 102 may continue to send one or more recommendations to the merchant device(s) 110. The merchant 104 may use the one or more recommendations to recommend item(s) that the customer 106 should acquire during the transaction. Based on the recommendations, the customer 106 may request to acquire the additional item(s) and the merchant device(s) 110 may send additional transaction information to the payment service 102. The payment service 102 can then continue to perform the processes described above to authorize additional amounts of funds based on the additional item(s) being acquired by the customer 106. In some instances, the payment service 102 may continue to perform such processes until the transaction is settled for a final amount of funds.

Figure 1D:
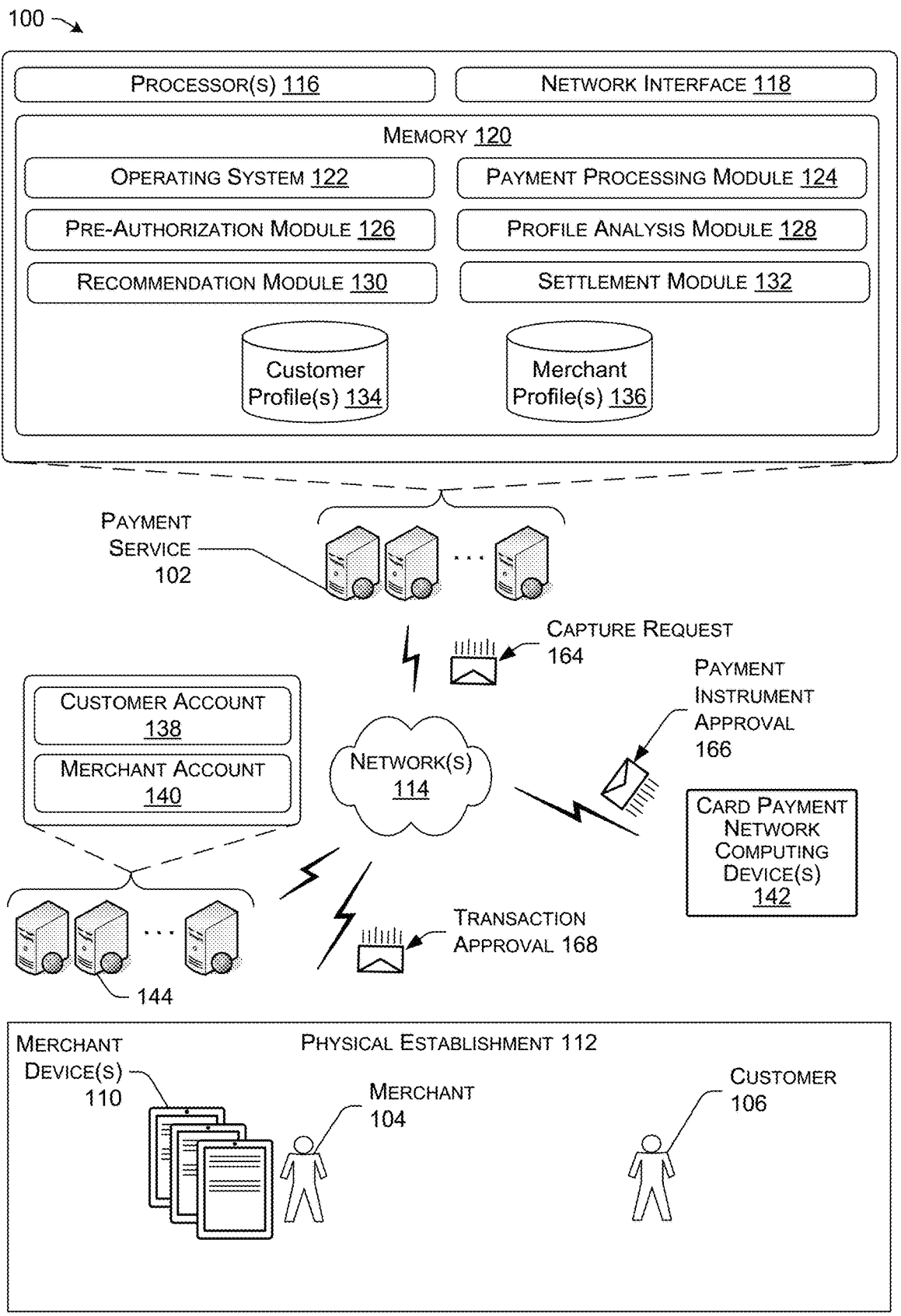

For instance, as illustrated in FIG. 1D, the payment service 102 can settle the transaction between merchant 104 and the customer 106 by utilizing the settlement module 132 to send a request to capture the final amount of funds (e.g., the costs of each of the items acquired during the transaction, which may include any taxes, fees, discounts, etc.) to the card payment network 142, which is represented by message 164. In some instances, the payment service 102 sends the request to capture the final amount of funds in response to receiving a message from the merchant device(s) 110 that indicates that the transaction is complete. For instance, after the customer 106 has finished acquiring items/services from the merchant 104, the merchant device(s) 110 may receive input indicating that the transaction is complete. In response, the merchant device(s) 110 may send the message to the payment service 102 that indicates that the transaction is complete.

Additionally, or alternatively, in some instances, the payment service 102 may utilize the settlement module 132 to send the request to capture the final amount of funds after a threshold amount of time. In some instances, the threshold amount of time can depend on the type of transaction being conducted between the merchant 104 and the customer 106. For example, the threshold amount of time may include a short time period (e.g., a minute, five minutes, etc.) when the customer 106 acquires item(s) from the merchant 104 that the customer 106 retrieves at a time of purchase. For another example, the threshold amount of time may include a long time period (e.g., a week, a month, etc.) when the customer 106 acquires item(s) form the merchant 104 that requires the customer 106 to return at a later date for pick-up.

Additionally, or alternatively, in some instances, the threshold amount of time for sending the request to capture the final amount of funds can depend on the type of business associated with the merchant 104. For example, if the merchant 104 offers items for acquisition that customers normally retrieve at the time of purchase, then the threshold amount of time may include a short time period. For another example, if the merchant 104 offers items for acquisition that customers purchase a first time, and then later pick-up at a second time, the threshold amount of time may include a long time period. In some instances, the payment service 102 can determine the type of business using the MCC associated with the merchant 104.

The card payment network 142 can receive the request to capture the final amount of funds from the payment service 102 and, based on receiving the request, settle the transaction. For instance, the card payment network 142 can cause the final amount of funds to be electronically transferred from the customer's account 138 to the merchant's account 140. In some instances, if the final amount of funds is less than the first amount of funds that was pre-authorized on the payment instrument 108, the card payment network 142 can stop holding any remaining balance. For instance, the card payment network 142 may stop holding the remaining balance which may be equal to a difference between the first amount of funds and the final amount of funds. In some instances, the card payment network 142 can further send the payment service 102 a message indicating that the final amount of funds has been electronically transferred, which is represented by message 166. Additionally, the payment service 102 can send the merchant device(s) 110 a message indicating that the transaction was approved for the final amount of funds, which is represented by message 168.

It should be noted that the example of FIGS. 1A-1D only illustrates a single merchant 104 and a single customer 106. However, in some instances, the payment service 102 may utilize similar processes to pre-authorize payment instruments for multiple transactions being conducted between the merchant 104 and one or more other customers. Additionally, the payment service 102 may utilize similar processes to pre-authorize payment instruments conducted between other merchants and one or more customers (e.g., the customer 106).

It should further be noted that the example of FIGS. 1A-1D illustrates the payment service 102 sending an additional authorization request 160 to the card payment network 142 after receiving an additional indication that the customer 106 has requested to acquire second item(s) 156 from the merchant 104 (e.g., after sending the initial pre-authorization request 150). However, in some instances, the payment service 102 may not send additional authorization requests to the card payment network 142 after the payment service 102 sends the initial authorization request 150. In such instances, the payment service 102 may just send the capture request 164 to the card payment network 142 based on the payment service 102 determining that the transaction is complete.

As discussed herein, processor(s) 116, may comprise one or more processors or processing cores. For example, the processor(s) 116 can be implemented as one or more microprocessors, microcomputers, microcontrollers, digital signal processors, central processing units, state machines, logic circuitries, and/or any devices that manipulate signals based on operational instructions. In some cases, the processor(s) 116 may be one or more hardware processors and/or logic circuits of any suitable type specifically programmed or configured to execute the algorithms and processes described herein. The processor(s) 116 can be configured to fetch and execute computer-readable processor-executable instructions stored in the memory.

Additionally, as discussed herein, memory 120, may be an example of tangible non-transitory computer storage media and may include volatile and nonvolatile memory and/or removable and non-removable media implemented in any type of technology for storage of information such as computer-readable processor-executable instructions, data structures, program modules or other data. The memory 120 may include, but is not limited to, RAM, ROM, EEPROM, flash memory, solid-state storage, magnetic disk storage, optical storage, and/or other computer-readable media technology. Further, in some cases, the payment service 102 can access external storage, such as RAID storage systems, storage arrays, network attached storage, storage area networks, cloud storage, or any other medium that can be used to store information and that can be accessed by the processor(s) directly or through another computing device or network. Accordingly, the memory 120 may be computer storage media able to store instructions, modules or components that may be executed by the processor(s). Further, when mentioned, non-transitory computer-readable media exclude media such as energy, carrier signals, electromagnetic waves, and signals per se.

The network interface(s) 118 may include one or more interfaces and hardware components for enabling communication with various other devices over the network or directly. For example, network interface(s) 118 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

Figure 2:
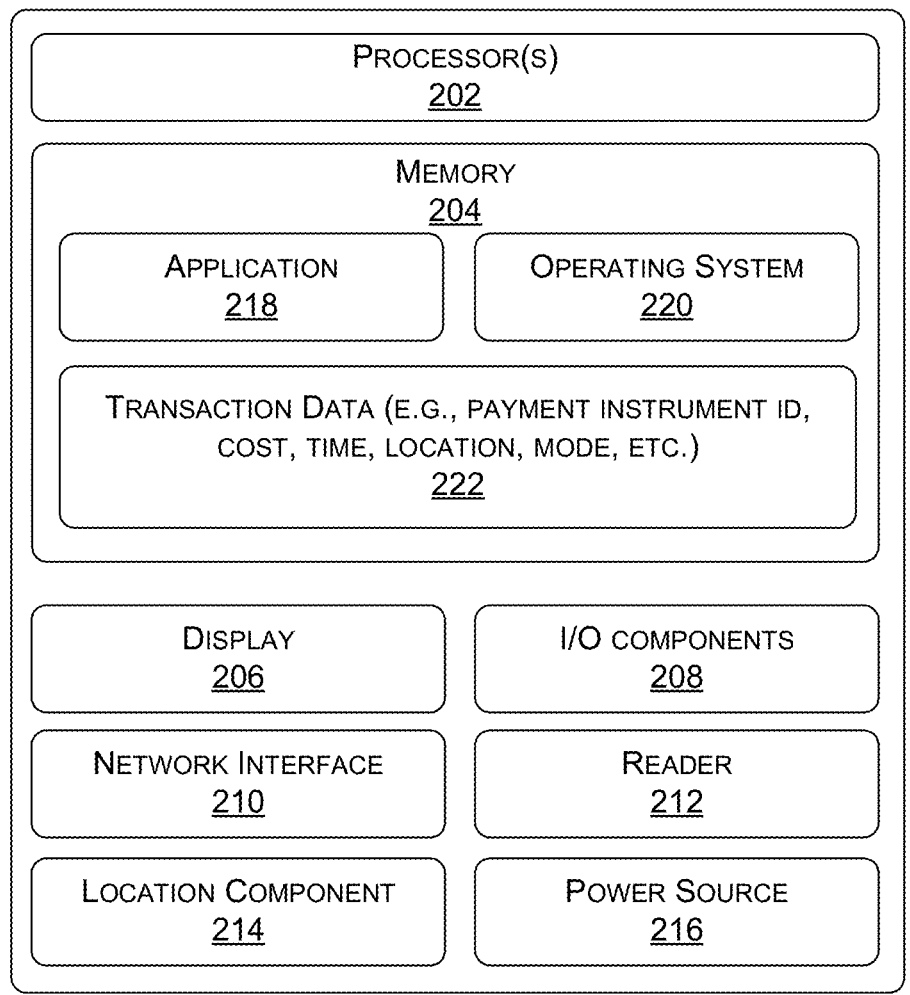
FIG. 2 illustrates example components of a merchant device.

FIG. 2 illustrates select example components of an example merchant device 110 according to some implementations. The merchant device 110 may be any suitable type of computing device, e.g., mobile, semi-mobile, semi-stationary, or stationary. Some examples of the merchant device 110 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the merchant device 110 includes at least one processor 202, memory 204, a display 206, one or more input/output (I/O) components 208, one or more network interface(s) 210, at least one card reader 212, at least one location component 214, and at least one power source 216. Each processor 202 may itself comprise one or more processors or processing cores. For example, the processor 202 can be implemented as one or more microprocessors, microcomputers, microcontrollers, digital signal processors, central processing units, state machines, logic circuitries, and/or any devices that manipulate signals based on operational instructions. In some cases, the processor 202 may be one or more hardware processors and/or logic circuits of any suitable type specifically programmed or configured to execute the algorithms and processes described herein. The processor 202 can be configured to fetch and execute computer-readable processor-executable instructions stored in the memory 204.

Depending on the configuration of the merchant device 110, the memory 204 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 204 may include, but is not limited to, RAM, ROM, EEPROM, flash memory, solid-state storage, magnetic disk storage, optical storage, and/or other computer-readable media technology. Further, in some cases, the merchant device 110 may access external storage, such as RAID storage systems, storage arrays, network attached storage, storage area networks, cloud storage, or any other medium that can be used to store information and that can be accessed by the processor 202 directly or through another computing device or network. Accordingly, the memory 204 may be computer storage media able to store instructions, modules or components that may be executed by the processor 202. Further, when mentioned, non-transitory computer-readable media exclude media such as energy, carrier signals, electromagnetic waves, and signals per se.

The memory 204 may be used to store and maintain any number of functional components that are executable by the processor 202. In some implementations, these functional components comprise instructions or programs that are executable by the processor 202 and that, when executed, implement operational logic for performing the actions and services attributed above to the merchant device 110. Functional components of the merchant device 110 stored in the memory 204 may include a merchant application 218, which may interact with applications executing on client devices to allow customers to pay for items offered by the merchant. The merchant application 218 may present an interface on the merchant device 110 to enable the merchant to conduct transactions, receive payments, and so forth, as well as communicating with a payment service for processing payments and sending transaction information. Further, the merchant application 218 may present an interface to enable the merchant to manage the merchant's account, and the like. Finally, the merchant application 218 may send data associated with the merchant to the payment service, and receive suggested gift card orders and values to associate with gift cards from the payment service.

Additional functional components may include an operating system 220 for controlling and managing various functions of the merchant device 110 and for enabling basic user interactions with the merchant device 110. The memory 204 may also store transaction data 222 that is received based on the merchant associated with the merchant device 110 engaging in various transactions with customers. Additionally, the memory 204 may store contact information for customer(s).

In addition, the memory 204 may also store data, data structures and the like, that are used by the functional components. For example, this data may include item information that includes information about the items offered by the merchant, which may include images of the items, descriptions of the items, prices of the items, and so forth. Depending on the type of the merchant device 110, the memory 204 may also optionally include other functional components and data, which may include programs, drivers, etc., and the data used or generated by the functional components. Further, the merchant device 110 may include many other logical, programmatic and physical components, of which those described are merely examples that are related to the discussion herein.

The network interface(s) 210 may include one or more interfaces and hardware components for enabling communication with various other devices over the network or directly. For example, network interface(s) 210 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 2 further illustrates that the merchant device 110 may include the display 206 mentioned above. Depending on the type of computing device used as the merchant device 110, the display 206 may employ any suitable display technology. For example, the display 206 may be a liquid crystal display, a plasma display, a light emitting diode display, an OLED (organic light-emitting diode) display, an electronic paper display, or any other suitable type of display able to present digital content thereon. In some examples, the display 206 may have a touch sensor associated with the display 206 to provide a touchscreen display configured to receive touch inputs for enabling interaction with a graphic interface presented on the display 206. Accordingly, implementations herein are not limited to any particular display technology. Alternatively, in some examples, the merchant device 110 may not include the display 206, and information may be present by other means, such as aurally.

The I/O components 208, meanwhile, may include speakers, a microphone, a camera, and various user controls (e.g., buttons, a joystick, a keyboard, a keypad, etc.), a haptic output device, and so forth. For instance, I/O components 208 can include a printing device for printing physical receipts for customers. In some examples, the merchant device 110 uses the printing device to print the physical receipts after receiving data representing the receipts from a payment service.

It should be noted that, in some examples, the I/O components 208 may be separate from the merchant device 110. For instance, the printing device may be separate from the merchant device 110. In some examples, the merchant device 110 sends data representing the receipts to the printing device in order to cause the printing device to print physical receipts.

In addition, the merchant device 110 may include or may be connectable to a payment instrument reader 212. In some examples, the reader 212 may plug in to a port in the merchant device 110, such as a microphone/headphone port, a data port, or other suitable port. In other instances, the reader 212 is integral with the entire merchant device 110. The reader 212 may include a read head for reading a magnetic strip of a payment card, and further may include encryption technology for encrypting the information read from the magnetic strip. Alternatively, numerous other types of card readers may be employed with the POS devices 600 herein, depending on the type and configuration of a particular merchant device 110.

The location component 214 may include a GPS device able to indicate location information, or the location component 214 may comprise another other location-based sensor. The merchant device 110 may also include one or more additional sensors (not shown), such as an accelerometer, gyroscope, compass, proximity sensor, and the like. Additionally, the merchant device 110 may include various other components that are not shown, examples of which include removable storage, a power control unit, and so forth.

Figure 3:
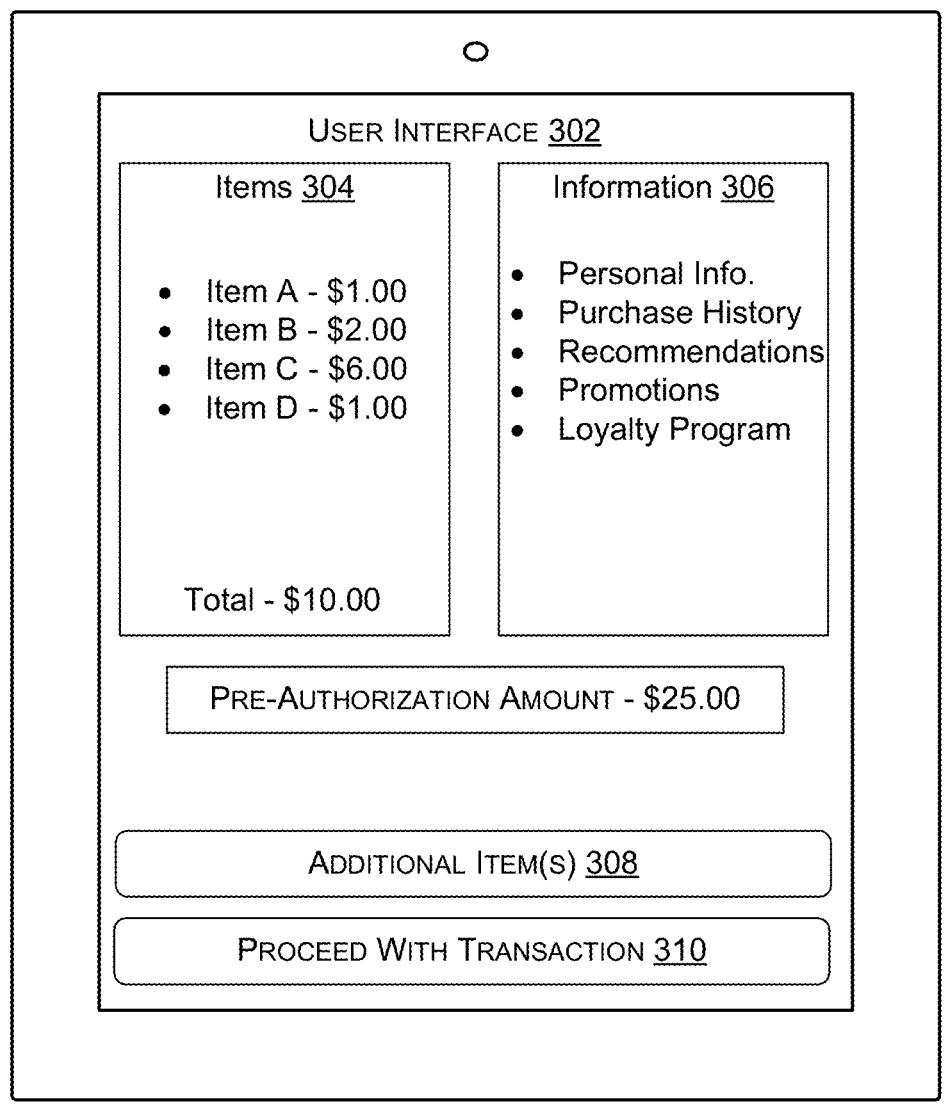
FIG. 3 illustrates an example user interface that a merchant device can present during a pre-authorized transaction between a merchant and a customer.

FIG. 3 illustrates an example user interface 302 that a merchant device 110 can present during a pre-authorized transaction between a merchant and a customer. As illustrated, the user interface 302 includes items 304 that the customer has already requested for acquisition from the merchant. For instance, in the example of FIG. 3, the customer may have already requested for the acquisition of Items A-D from the merchant during the transaction. Along with the list of the Items A-D, the Items 304 portion of the user interface 302 further indicates the cost of each of the Items A-D as well as the current total cost of the transaction.

The user interface 302 further includes information 306 associated with the customer. In some instances, the merchant device 110 receives the information 306 from a payment service. For instance, the merchant device 110 can receive the additional data 154 from the payment service 102 in the example of FIGS. 1A-1D and, in response, present at least a portion of information 306 represented by the additional data 154. As illustrated in FIG. 3, the information 306 can include one or more of personal information associated with the customer, a purchase history associated with the customer, recommendations for the customer, promotions to offer the customer, and loyalty program information associated with the customer.

The personal information can include one or more of a name of the customer, a picture of the customer, contact information (e.g., telephone number, email address, address, etc.) associated with the customer, an age of the customer, one or more preferences of the customer, or the like. The purchase history can include one or more items or services previously acquired by the customer. In some instances, the one or more items or services were previously acquired by the customer from the merchant. Additionally, or alternatively, in some instances, the one or more items or services were previously acquired by the customer from one or more additional merchants.

The recommendations can include one or more recommendations for items or services that the merchant should offer to the customer. As discussed above, in some instances, the payment service can determine the recommendations based on the items and/or services previously acquired by the customer from the merchant and/or one or more additional merchants. For example, if the customer acquired Item E along with Item A from the merchant in a previous transaction, the recommendations may indicate that the merchant offer Item E to the customer during the current transaction. For another example, if the customer has typically acquired Item G from the merchant during previous transaction, the recommendations may indicate that the merchant offer Item G to the customer during the current transaction.

The promotions can include any promotions, coupons, discounts, and/or other deals for item(s) and/or service(s) that the merchant can offer to the customer. In some instances, the payment service may determine the promotions based on previous transactions between the customer and the merchant. For example, if the customer has typically acquired Item H from the merchant during previous transaction, the promotions may include a coupon for Item H. Additionally, or alternatively, in some instances, the payment service may determine the promotions based on the current Items 304 that the customer has requested to acquire during the transaction. For example, the payment service may determine that other customers that acquire Item D also acquire Item L. As such, the payment service may generate and send the merchant device 110 a promotion that the merchant can offer the customer for Item L.

The loyalty program information can indicate whether the customer is already enrolled in the merchant's loyalty program and, if the customer is already enrolled, loyalty points that have already been earned by the customer. In some instances, the merchant may use the loyalty program information during the transaction with the customer. For example, the merchant can offer that the customer enrolls in the loyalty program if the customer is not currently enrolled. For another example, the merchant can determine one or more additional promotions to offer the customer based on the number of loyalty points that have already been earned by the customer.

As further illustrated in FIG. 3, the user interface 302 indicates the pre-authorization amount for the transaction. In some instances, the merchant can use the pre-authorization amount during the transaction to determine whether the customer is required to provide the payment instrument a second time during the transaction. For example, in some instances, as long as the total cost of the transaction is below or equal to the pre-authorization amount, the merchant may determine that the customer is not required to provide the payment instrument for a second authorization. For another example, in some instances, based on adding more items to the transaction that causes the total cost to exceed the pre-authorization amount, the merchant may determine that the customer is required to provide the payment instrument a second time for authorization during the transaction.

The user interface 302 further includes an additional item(s) icon 308 and a proceed with transaction icon 310. The merchant can select the additional item(s) icon 308 to add additional items to the transaction. For instance, if the customer acquires Item F, the merchant can select the additional item(s) icon 308 to add Item F to the transaction. The merchant can select the proceed with transaction icon 310 to indicate that the transaction between the merchant and customer is finished (e.g., the customer is not acquiring any additional items). In some instances, the merchant device 110 can receive input via the proceed with transaction icon 310 and, in response, send a message to the payment service indicating that the transaction is complete. The payment service may then receive the message from the merchant device 110 and, based on receiving the message, settle the transaction.

Figure 4:
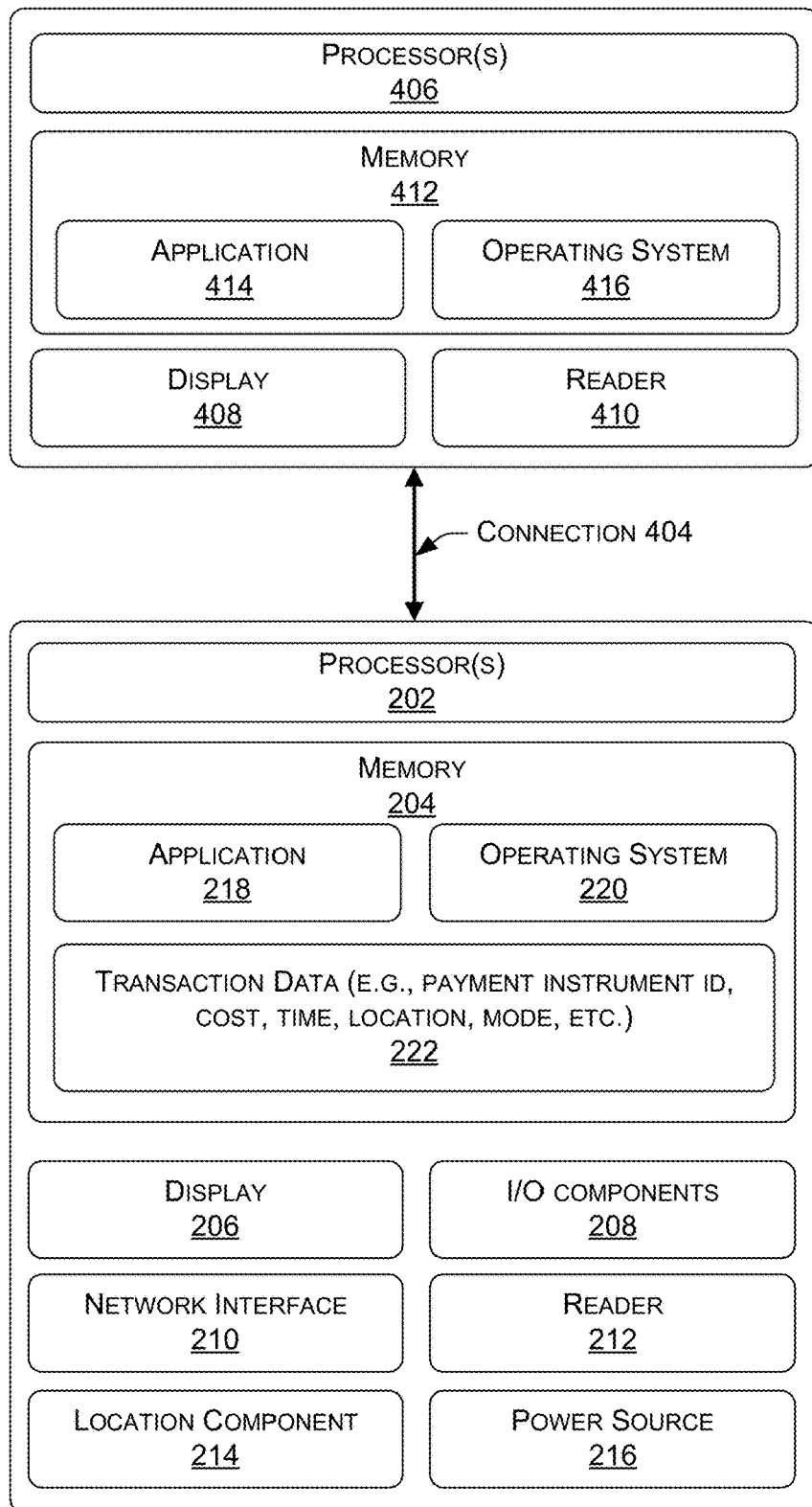
FIG. 4 illustrates example components of a merchant device when the merchant device includes a merchant-facing device and a buyer-facing device.

FIG. 4 illustrates example components of a merchant device 110 when the merchant device includes a merchant-facing device that is attached to a second merchant device 402, which is also referred to as a buyer-facing device. For instance, in the example of FIG. 4, the merchant can utilize the merchant-facing device during the transaction to input information associated with item(s)/service(s) being acquired by the customer. The customer can then use the buyer-facing device 402 to enter payment information associated with a payment instrument. As shown, the merchant-facing device is connected to the buyer-facing device 402 using a connection 404. In some instances, the connection 404 can include a physical connection, such as Ethernet, DOCSIS, DSL, Fiber, universal serial bus (USB), or the like. Additionally, or alternatively, in some instances, the connection 404 can include wireless connection, such as WLAN, GSM, CDMA, 802.11, Bluetooth, Wireless USB, cellular, satellite, the Internet, or the like.

As shown, the buyer-facing device 402 includes processor(s) 406, a display 408, a reader 410, and a memory 412, which may store at least an application 414 and an operating system 416. In some instance, the processor(s) 406, the display 408, the reader 410, the memory 412, the application 414, and the operating system 416 may respectively be similar to the processor(s) 202, the display 206, the reader 212, the memory 204, the application 218, and the operating system 220 described above.

Figure 5:
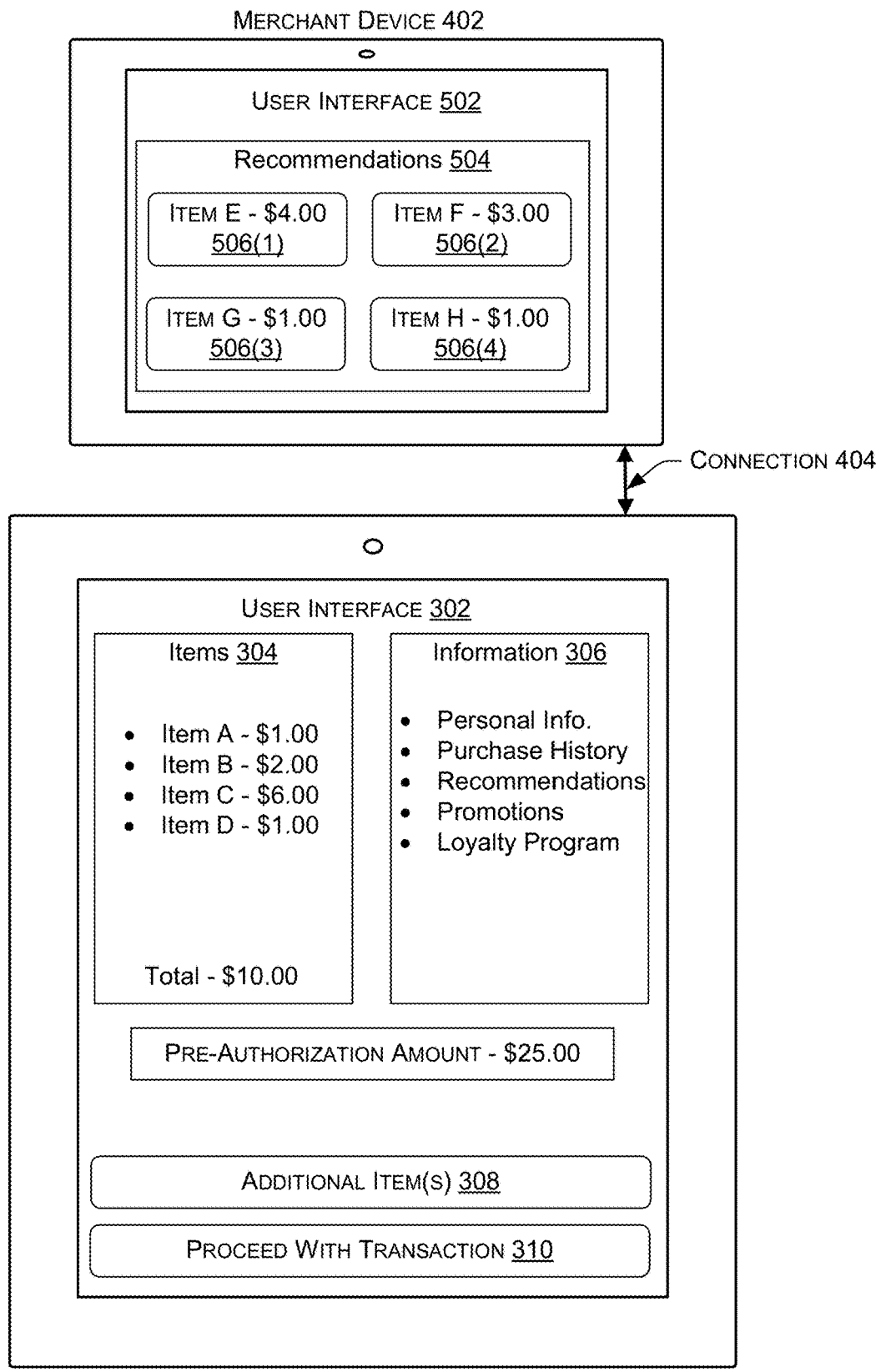
FIG. 5 illustrates example user interfaces that merchant devices can respectively present during a pre-authorized transaction between a merchant and a customer.

FIG. 5 illustrates example user interfaces that merchant devices can respectively present during a pre-authorized transaction between a merchant and a customer. As illustrated, the merchant device 110, which may include the merchant-facing device, presents user interface 302 discussed above with regard to FIG. 3. Additionally, the merchant device 402, which may include the buyer-facing device, also presents a user interface 502. For instance, based on receiving the data from the payment service that causes the merchant device 110 to present the information via the user interface 302, the merchant device 110 may send data to the merchant device 402 that causes the merchant device 402 to present information via the user interface 502. In some instances, the merchant device 110 sends the data to the merchant device 402 based on receiving an instruction from the payment service to send the data. For instance, the payment service can determine that the merchant device 110 is connected to the merchant device 402. Based on the determination, the payment service can send the instruction along with the data to the merchant device 110.

As illustrated in the example of FIG. 5, the user interface 502 includes recommendations 504 for four additional Items E-H. However, in some instances, the user interface 502 may include recommendations for any number of items (e.g., one, two, five, ten, etc.). In some instances, and as illustrated in the example of FIG. 5, the user interface 502 includes graphical icons 506(1)-(6) that the customer can select to respectively add one of Items E-H to the transaction. For instance, if the customer decides to acquire Item E, the customer can select the graphical icon 506(1). The merchant device 402 can then receive the input from the customer and send data indicating the input to the merchant device 110. In response, the merchant device 110 can add Item E to the transaction and send transaction information associated with Item E to the payment service.

It should be noted that, in some instances, the user interface 502 provided by the merchant device 402 may include more or less information. For instance, in some examples, the user interface may include the items 304 and the information 306 presented by the user interface 302. Additionally, in some examples, the user interface 502 may include one or more of the personal information, the purchase history, the recommendations, the promotions, or the loyalty program information presented by the user interface 302.

Figure 6A:
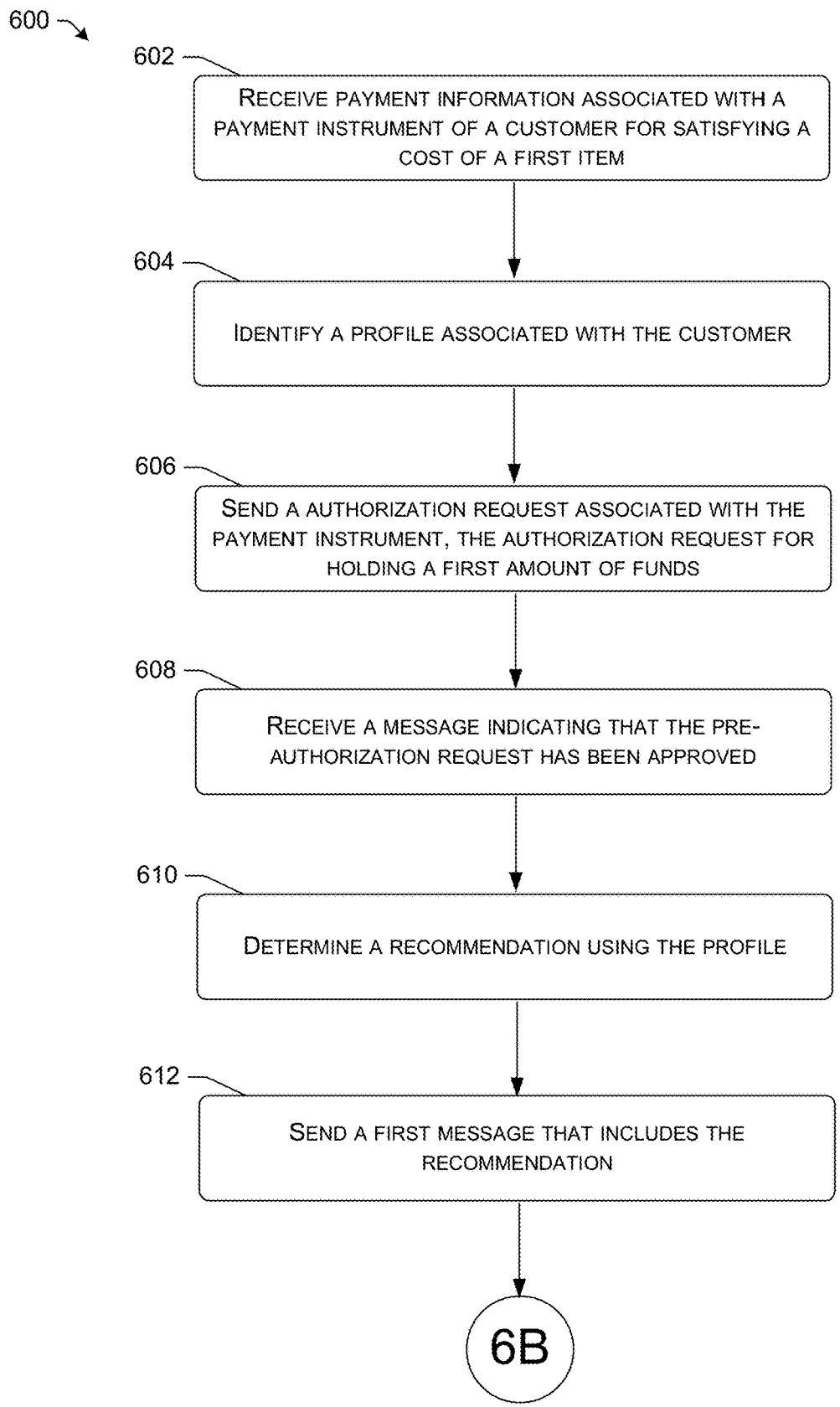
FIGS. 6A-6B illustrate a flow diagram of an example process for pre-authorizing a payment instrument during a transaction between a merchant and a customer.
Figure 6B:
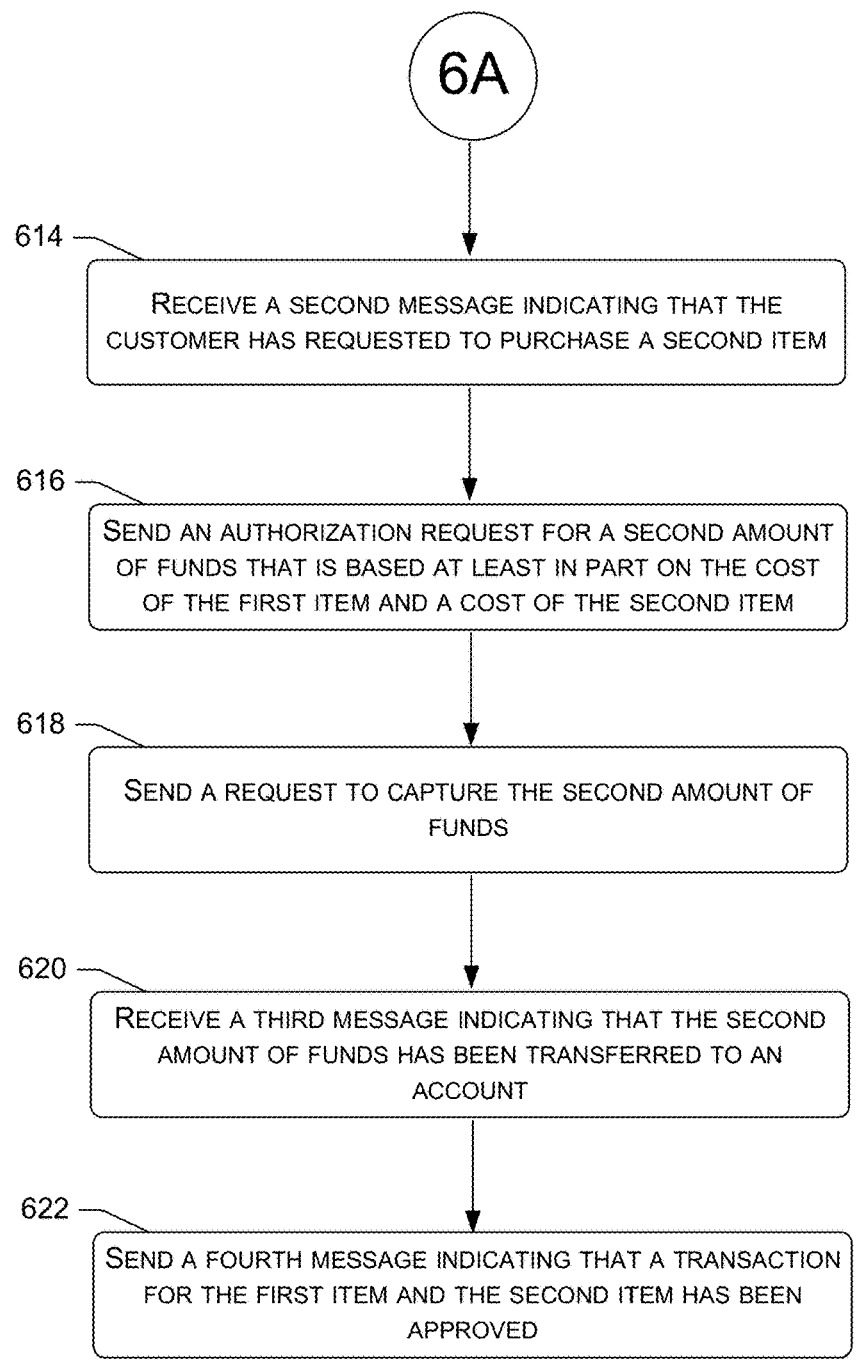

FIGS. 6A-6B illustrate a flow diagram of an example process 600 for pre-authorizing a payment instrument during a transaction between a merchant and a customer. The process 600, and other processes described herein, are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 600, and other processes described herein, may be performed by a payment service, a merchant device, or by a combination thereof.

At 602, a payment service 102 receives payment information associated with a payment instrument of a customer for satisfying a cost of a first item. For instance, the payment service may receive, from a merchant device associated with a merchant, first transaction information associated with a transaction between the merchant and a customer. The first transaction information can include at least the payment information, an identity of the first item, and a cost of the first item. In some instances, the first transaction information may further include a first amount of funds to pre-authorize on the payment instrument.

At 604, the payment service 102 identifies a profile associated with the customer. For instance, the payment service 102 may store profiles of customers, where each profile is associated with respective data, such as customer information, transaction data associated with previous transactions, loyalty membership information, and/or the like. In some instances, the payment service 102 can use an identity of the customer to identify the profile including past purchase behavior at one or more merchants, which may be used to determine the amount of funds for the preauthorization request. Additionally, or alternatively, in some instances, the payment service 102 uses the payment information as the identity of the customer to identify the profile.

At 606, the payment service 102 sends an authorization request associated with the payment instrument, the authorization request for holding a first amount of funds. For instance, the payment service 102 may send a message to a card payment network that requests pre-authorization for holding the first amount of funds, where the message includes at least the payment information. In some instances, the message may further indicate the first amount of funds to pre-authorize on the card. For instance, in some examples, the payment service 102 may determine the first amount of funds based on at least one of the cost of the first item, the profile associated with the customer a merchant profile, or the like. For example, the payment service 102 may determine the first amount of funds based on the profile indicating that the customer in a previous transaction acquired the first item along with a second item, and the first amount may relate to (e.g., be equal to, be within a percentage, etc.) a total cost of the first item and the second item. In other examples, the payment service 102 may determine the first amount of funds from the first transaction information received from the merchant device.

At 608, the payment service 102 receives a message indicating that the pre-authorization request has been approved. For instance, based on receiving the pre-authorization request, the card payment network can pre-authorize the payment instrument for the first amount of funds. As discussed above, pre-authorization can include verifying the transaction that is initiated with the payment instrument and holding a balance as unavailable until the merchant settles the transaction (e.g., sends a request to capture the funds) or an expiration of given time period. In some instances, holding the balance can include deducting the balance from the customer's credit limit, when the payment instrument is a credit card, or deducting the balance from the customer's bank balance, when the payment instrument is a debit card. The card payment network can then send the message indicating that the pre-authorization has been approved back to the payment service.

At 610, the payment service 102 determines a recommendation using the profile. For instance, the payment service 102 may analyze the data associated with the profile to identify the recommendation for the customer. For example, the payment service 102 can analyze transaction data associated with the profile, where the transaction data is associated with previous transactions between the customer and the merchant and/or one or more other merchants. Based on the analysis, the payment service 102 can identify that, during a previous transaction, the customer acquired the first item along with a second item. In response, the payment service 102 can determine to recommend that the customer acquire the second item during the current transaction with the merchant.

At 612, the payment service 102 sends a first message that includes the recommendation and at 614, the payment service 102 receives a second message indicating that the customer has requested to purchase the second item. For instance, the payment service 102 can send the first message that includes the recommendation to the merchant device. The merchant device can receive the first message and, in response, present the recommendation to the merchant and/or the customer. The merchant device can then receive input from the merchant and/or the customer that indicates that the customer is acquiring the second item. Based on the input, the merchant device can send, and the payment service 102 can receive, the second message indicating that the customer has requested to purchase the second item.

At 616, the payment service 102 sends an authorization request for a second amount of funds that is based at least in part on the cost of the first item and a cost of the second item. For instance, based on receiving the second message from the merchant device, the payment service 102 can determine the second amount of funds. The payment service 102 can then send the authorization request to the card payment network that requests the authorization for the second amount of funds. In some instances, sending the authorization request includes updating the first authorization request from step 606 using the second amount of funds. In some instance, the second amount of funds is less than or equal to the first amount of funds that the card payment network pre-authorized for the payment instrument.

At 618, the payment service 102 sends a request to capture the second amount of funds. For instance, the payment service 102 may determine to settle the transaction between the merchant and the customer. In some instances, the payment service 102 determines to settle the transaction based on receiving a message from the merchant device that indicates that the transaction is complete. In some instances, the payment service 102 determines to settle the transaction based on an expiration of a threshold amount of time. In either instance, the payment service 102 can then send the request to capture the funds to the card payment network.

At 620, the payment service 102 receives a third message indicating that the second amount of funds has been transferred to an account and at 622, the payment service 102 sends a fourth message indicating that a transaction for the first item and the second item is approved. For instance, based on receiving the request to capture the second amount of funds from the payment service, the card payment network can cause the second amount of funds to be transferred from an account associated with the customer to an account associated with the merchant. The payment service 102 can then receive the third message from the card payment network in response. Additionally, the payment service 102 can send the fourth message to the merchant device to notify the merchant that the transaction has been approved.

Figure 7A:
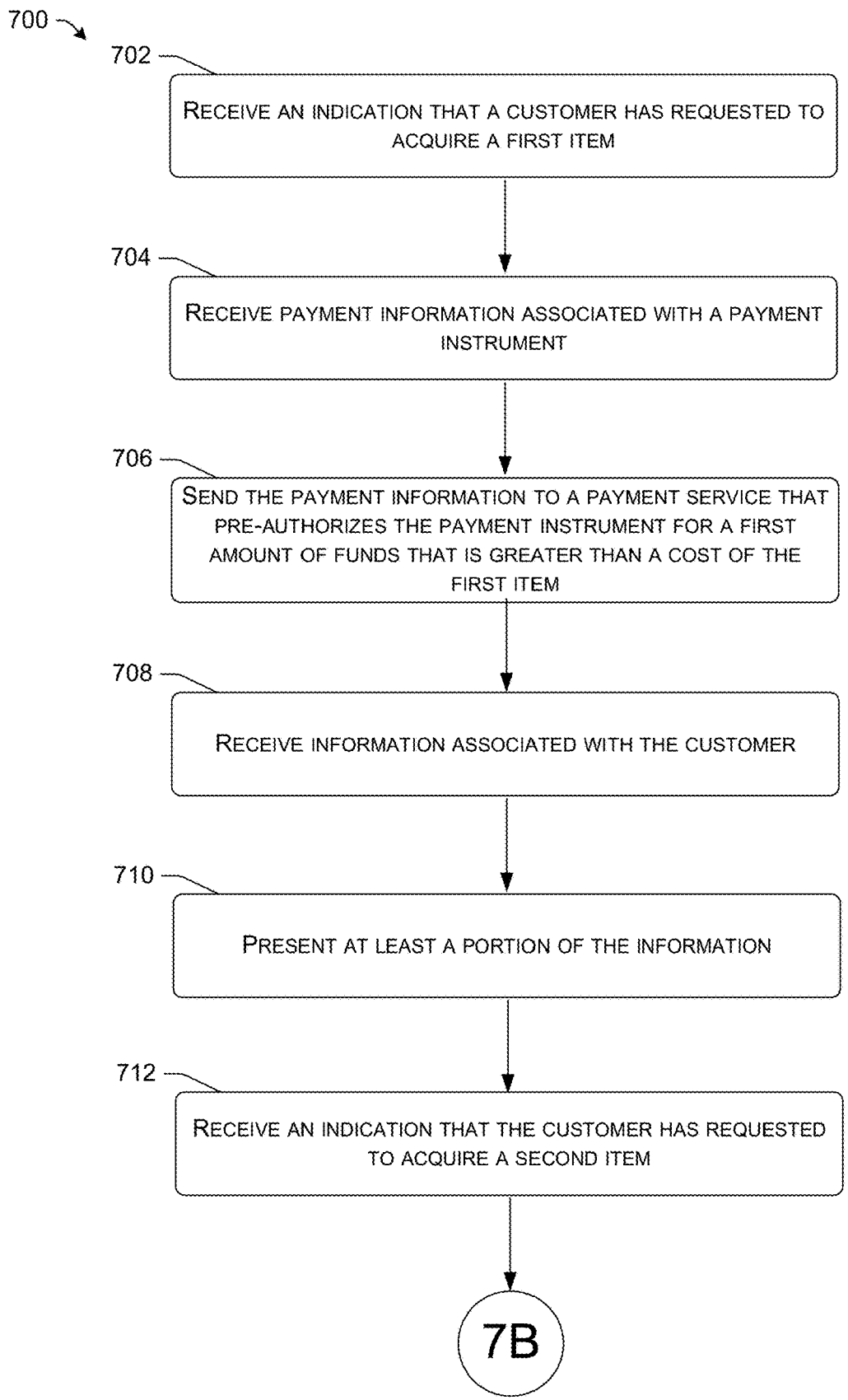
FIGS. 7A-7B illustrate a flow diagram of an example process of conducting a transaction in which a payment instrument is pre-authorized for an amount of funds.
Figure 7B:
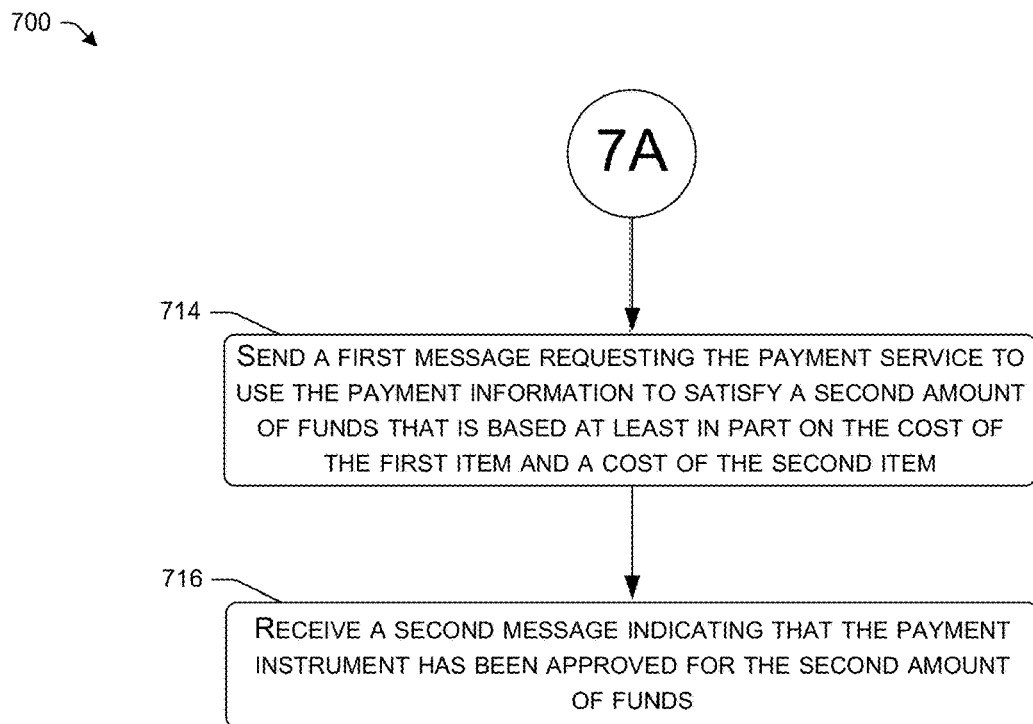

FIGS. 7A-7B illustrate a flow diagram of an example process 700 of conducting a transaction in which a payment instrument is pre-authorized for an amount of funds. At 702, a merchant device 110 receives an indication that a customer has requested to acquire a first item and at 704, the merchant device 110 receives payment information associated with a payment instrument. For instance, the merchant device 110 may receive, via one or more input devices, first transaction information associated with a transaction between a merchant and the customer. The first transaction information can indicate at least a first item being acquired by the customer, a first cost of the first item, and payment information associated with a payment instrument.

At 706, the merchant device 110 sends the payment information to a payment service that pre-authorizes the payment instrument for a first amount of funds that is greater than a cost of the first item. For instance, the merchant device 110 can send the first transaction information to the payment service. In response, the payment service may pre-authorize, via a card payment network, the payment instrument for a first amount of funds, where the first amount of funds is greater than the cost of the first item. The merchant device 110 may then receive a message indicating that the payment instrument was pre-authorized from the first amount of funds from the payment service.

At 708, the merchant device 110 receives information associated with the customer and at 710, the merchant device 110 presents at least a portion of the information. For instance, the payment service may further identify, using a profile associated with the customer, information associated with the customer. The information can include customer information, one or more recommendations, one or more promotions, or the like. The merchant device 110 can then receive the information from the payment service and, in response, present at least a portion of the information. In some instances, when the merchant device includes a merchant-facing device and a buyer-facing device, both the merchant-facing device and the buyer-facing device may present portions (either similar or different) of the information.

At 712, the merchant device 110 receives an indication that the customer has requested to acquire a second item. For instance, the merchant device 110 may receive input, via an input device, that indicates that the customer is acquiring the second item. In some instances, the merchant device 110 may receive the input from the merchant. In some instances, when the merchant device includes a merchant-facing device and a buyer-facing device, the merchant device 110 can receive the input from the customer via the buyer-facing device. In either of the instances, the merchant device 110 can then add the second item to the transaction between the merchant and the customer.

At 714, the merchant device 110 sends a first message requesting the payment service to use the payment information to satisfy a second amount of funds that is based at least in part on the cost of the first item and a cost of the second item. For instance, the merchant device 110 may determine that the customer is finished acquiring items from the merchant. In some instances, the merchant device 110 may make the determination based on receiving input from the merchant and/or the customer. The merchant device 110 can then determine the second amount of funds associated with the transaction, where the second amount of funds is based on the costs of each of the items. Additionally, the merchant device 110 can send the first message requesting that the payment service use the payment information to satisfy the second amount of funds.

At 716, the merchant device 110 receives a second message indicating that the payment instrument has been approved for the second amount of funds. For instance, the payment service may authorize the payment instrument for the second amount of funds using the card payment network. In response, the payment service may send the second message to the merchant device 110.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method implemented at least in part at a point-of-sale (POS) device of a merchant of a plurality of merchants associated with a payment-processing service, the method comprising:
    receiving, at the POS device, an indication that a customer of a plurality of customers has requested to acquire a first item associated with a first cost from the merchant;
    receiving payment information associated with a payment instrument of the customer for satisfying the first cost of the first item;
    receiving, from the payment-processing service:
        historical transaction data associated with transactions between one or more other customers of the plurality of customers and the plurality of merchants, the historical data indicating that one or more other customers have previously purchased, in a same transaction, the first item and at least one additional item; and
        an average transaction amount of the merchant, wherein the average transaction amount is associated with a merchant profile;
    determining, based at least in part on the average transaction amount, the historical transaction data, and the first cost, an amount of funds for which to request authorization;
    based on determining the amount of funds, sending the payment information to the payment-processing service, wherein an authorization request is sent by the payment-processing service to a payment network associated with the payment instrument for the amount of funds;

receiving, from the payment-processing service, an indication that the payment network has approved the authorization request;

displaying on a user interface of the POS device a recommendation that the merchant offer the at least one additional item to the customer prior to finalizing a payment transaction with the customer for the first item;

receiving user input data corresponding to user input to the user interface display of the POS device that the customer has requested to purchase the at least one additional item;

determining a second amount of funds based on the first cost of the first item and an additional cost of the at least one additional item;

determining, that the second amount of funds is less than the amount of funds approved indicating the customer may acquire the first item and the at least one additional item absent a second authorization request; and sending, to the payment-processing service, a request for the second amount of funds, wherein the request is sent by the payment-processing service to the payment network.

2. The method as recited in claim 1, wherein the merchant profile indicates a status of the customer in a loyalty program offered by the merchant, and the method further comprises receiving, from the payment-processing service, an indication of the status of the customer in the loyalty program offered by the merchant.

3. The method as recited in claim 1, wherein the merchant profile indicates that the customer has not yet enrolled in a loyalty program offered by the merchant, and the method further comprises receiving, from the payment-processing service, an indication that the customer has not yet enrolled in the loyalty program offered by the merchant.

4. The method as recited in claim 3, further comprising:
receiving, by the POS device and from the payment-processing service, a recommendation that the merchant offer an enrollment in a first loyalty program to the customer; and
sending, by the POS device and to the payment-processing service, an indication that the customer has requested to enroll in the first loyalty program.

5. The method as recited in claim 1, wherein the merchant profile indicates that the customer is eligible for at least one of a promotion or discount offered by the merchant.

6. The method as recited in claim 5, further comprising:
receiving, by the POS device and from the payment-processing service, a recommendation that the merchant offer at least one of a promotion or discount offered by the merchant to the customer; and
sending, by the POS device and to the payment-processing service, an indication that the customer has requested to redeem the at least one of the promotion or the discount offered by the merchant.

7. A system comprising:
one or more processors; and
one or more computer-readable media storing computer-executable instructions that, when executed, cause the one or more processors to perform acts comprising:
receiving, at a point-of-sale (POS) device, an indication that a customer of a plurality of customers has requested to acquire a first item associated with a first cost from a merchant of a plurality of merchants associated with a payment-processing service;

receiving payment information associated with a payment instrument of the customer for satisfying the first cost of the first item;

receiving, from the payment-processing service:
historical transaction data associated with transactions between one or more other customers of the plurality of customers and the plurality of merchants, the historical data indicating that one or more other customers have previously purchased, in a same transaction, the first item and at least one additional item; and
an average transaction amount of the merchant, wherein the average transaction amount is associated with a merchant profile;

determining, based at least in part on the average amount, the historical transaction data, and the first cost, an amount of funds for which to request authorization;

based on determining the amount of funds, sending the payment information to the payment-processing service, wherein an authorization request is sent by the payment-processing service to a payment network associated with the payment instrument for the amount of funds;

receiving, from the payment-processing service, an indication that the payment network has approved the authorization request;

displaying on a user interface of the POS device a recommendation that the merchant offer the at least one additional item to the customer prior to finalizing a payment with the customer for the first item;

receiving user input data corresponding to user input to the user interface of the POS device that the customer has requested to purchase the at least one additional item;

determining a second amount of funds based on the first cost of the first item and an additional cost of the at least one additional item;

determining, that the second amount of funds is less than the amount of funds approved indicating the customer may acquire the first item and the at least one additional item absent a second authorization request; and sending, to the payment-processing service, a request for the second amount of funds, wherein the request is sent by the payment-processing service to the payment network.

8. The system of claim 7, wherein the historical transaction data indicates that there is at least one additional item, associated with a second cost, to upsell to customers in lieu of the first item, wherein the second cost is greater than the first cost.

9. The system of claim 8, the acts further comprising:
determining, by the payment-processing service, to upsell at least one additional item to the customer in lieu of the first item based at least in part on the historical transaction data;
sending, to the payment-processing service, a request to use the payment information to satisfy the second cost, the payment-processing service sending a capture request for the amount of funds; and
receiving, at the POS device, an indication that the payment information has been approved for the amount of funds.

10. The system of claim 9, wherein the payment information associated with the payment instrument of the customer is not sent again after the payment-processing service sends the authorization request for the amount of funds.

11. The system of claim 7, wherein the merchant profile indicates a status of the customer in a loyalty program offered by the merchant, and the acts further comprises receiving, from the payment-processing service, an indication of the status of the customer in the loyalty program offered by the merchant.

12. The system of claim 7, wherein the merchant profile indicates that the customer is eligible for at least one of a promotion or discount offered by the merchant.

13. One or more non-transitory computer-readable media storing computer-executable instructions that, when executed, cause one or more processors to perform acts comprising:
   receiving, at a point-of-sale (POS) device, an indication that a customer of a plurality of customers has requested to acquire a first item associated with a first cost from a merchant of a plurality of merchants associated with a payment-processing service;
   receiving payment information associated with a payment instrument of the customer for satisfying the first cost of the first item;
   receiving, from the payment-processing service:
      historical transaction data associated with transactions between one or more other customers of the plurality of customers and the plurality of merchants, the historical data indicating that one or more other customers have previously purchased, in a same transaction, the first item and at least one additional item; and
      an average transaction amount of the merchant, wherein the average transaction amount is associated with a merchant profile;
   determining, based at least in part on the average amount, the historical transaction data, and the first cost, an amount of funds for which to request authorization;
   based on determining the amount of funds, sending the payment information to the payment-processing service, wherein an authorization request is sent by the payment-processing service-sending an authorization request to a payment network associated with the payment instrument for the amount of funds;
   receiving, from the payment-processing service, an indication that the payment network has approved the authorization request;
   displaying on a user interface of the POS device a recommendation that the merchant offer the at least one additional item to the customer prior to finalizing a payment transaction with the customer for the first item;
   receiving user input data corresponding to user input to the user interface display of the POS device that the customer has requested to purchase the at least one additional item;
   determining a second amount of funds based on the first cost of the first item and an additional cost of the at least one additional item;
   determining, that the second amount of funds is less than the amount of funds approved indicating the customer may acquire the first item and the at least one additional item absent a second authorization request; and
   sending, to the payment-processing service, a request for the second amount of funds, wherein the request is sent by the payment-processing service to the payment network.

14. The one or more non-transitory computer-readable media of claim 13, wherein the merchant profile indicates that the customer has not yet enrolled in a loyalty program offered by the merchant, and the acts further comprises receiving, from the payment-processing service, an indication that the customer has not yet enrolled in the loyalty program offered by the merchant.

15. The one or more non-transitory computer-readable media of claim 14, the acts further comprising:
   receiving, by the POS device and from the payment-processing service, a recommendation that the merchant offer an enrollment in a first loyalty program to the customer; and
   sending, by the POS device and to the payment-processing service, an indication that the customer has requested to enroll in for the first loyalty program.

16. The system of claim 7, wherein the merchant profile indicates that the customer has not yet enrolled in a loyalty program offered by the merchant, and the acts further comprising receiving, from the payment-processing service an indication that the customer has not yet enrolled in the loyalty program offered by the merchant.

17. The system of claim 16, the acts further comprising:
   receiving, by the POS device and from the payment-processing service, a recommendation that the merchant offer an enrollment in a first loyalty program to the customer; and
   sending, by the POS device and to the payment-processing service, an indication that the customer has requested to enroll in the first loyalty program.

18. The system of claim 12, the acts further comprising:
   receiving, by the POS device and from the payment-processing service, a recommendation that the merchant offer at least one of a promotion or discount offered by the merchant to the customer; and
   sending, by the POS device and to the payment-processing service, an indication that the customer has requested to redeem the at least one of the promotion or the discount offered by the merchant.

19. The one or more non-transitory computer-readable media of claim 13, wherein the merchant profile indicates that the customer is eligible for at least one of a promotion or discount offered by the merchant.

20. The one or more non-transitory computer-readable media of claim 19, the acts further comprising:
   receiving, by the POS device and from the payment-processing service, a recommendation that the merchant offer at least one of a promotion or discount offered by the merchant to the customer; and
   sending, by the POS device and to the payment-processing service, an indication that the customer has requested to redeem the at least one of the promotion or the discount offered by the merchant.

* * * * *